US012127635B2

(12) United States Patent
Miller et al.

(10) Patent No.: US 12,127,635 B2
(45) Date of Patent: Oct. 29, 2024

(54) MAGNETICALLY GUIDED LATCH

(71) Applicant: Harry Miller Co., LLC, Boston, MA (US)

(72) Inventors: Harry Miller, Boston, MA (US); Dodd H. Grande, Seattle, WA (US)

(73) Assignee: Harry Miller Co., LLC, Boston, MA (US)

(*) Notice: Subject to any disclaimer, the term of this patent is extended or adjusted under 35 U.S.C. 154(b) by 101 days.

(21) Appl. No.: 17/351,106

(22) Filed: Jun. 17, 2021

(65) Prior Publication Data

US 2021/0392856 A1  Dec. 23, 2021

Related U.S. Application Data

(60) Provisional application No. 63/040,752, filed on Jun. 18, 2020.

(51) Int. Cl.
*A44B 11/25* (2006.01)

(52) U.S. Cl.
CPC ................ *A44B 11/2592* (2013.01)

(58) Field of Classification Search
CPC .............................................. A44B 11/2592
See application file for complete search history.

(56) References Cited

U.S. PATENT DOCUMENTS

| 2,475,226 A | 7/1949 | Ellis | |
| 3,623,194 A * | 11/1971 | Claeson | B60R 22/18 |
| | | | 24/639 |
| 4,416,037 A * | 11/1983 | Panthofer | A01K 27/005 |
| | | | 24/665 |
| 5,329,883 A * | 7/1994 | White | A01K 27/005 |
| | | | 119/779 |
| 5,752,299 A * | 5/1998 | Vivacqua | B60R 22/48 |
| | | | 297/468 |
| 5,839,174 A * | 11/1998 | Chamings | B60R 22/48 |
| | | | 24/642 |

(Continued)

FOREIGN PATENT DOCUMENTS

| CN | 101782101 A | 7/2010 |
| CN | 102098937 A | 6/2011 |

(Continued)

OTHER PUBLICATIONS

The Home Depot; Lokk Latch; Black Polymer and Stainless Steel Two-way Magnetic Self-latching Fence Gate Latch 50110; Aug. 8, 2019; 4 pages.

(Continued)

*Primary Examiner* — Jason W San
(74) *Attorney, Agent, or Firm* — Lowe Graham Jones, PLLC

(57) ABSTRACT

Embodiments are directed toward a latch. The latch preferably has a housing that defines a receiver channel that is configured to receive a latchable member. The latch preferably has a catch that is transitionable between an open configuration and a closed configuration. In the open configuration, the catch is preferably configured to enable insertion and removal of the latchable member into and from the receiver channel. In the closed configuration, the catch is preferably configured to at least partially close the receiver channel and to prevent removal of the latchable member from the receiver channel.

19 Claims, 20 Drawing Sheets

(56) References Cited

U.S. PATENT DOCUMENTS

| | | | |
|---|---|---|---|
| 5,898,366 A * | 4/1999 | Brown | B60R 22/48 180/270 |
| 5,934,599 A | 8/1999 | Hammerslag | |
| 6,289,558 B1 | 9/2001 | Hammerslag | |
| 6,381,815 B1 * | 5/2002 | Yamaguchi | B60R 22/48 24/641 |
| 6,499,437 B1 | 12/2002 | Sorenson et al. | |
| 6,671,933 B1 * | 1/2004 | Friend | A01K 27/005 24/115 F |
| 7,145,425 B2 | 12/2006 | Clement | |
| 7,591,050 B2 | 9/2009 | Hammerslag | |
| 7,950,112 B2 | 5/2011 | Hammerslag et al. | |
| 7,954,204 B2 | 6/2011 | Hammerslag et al. | |
| 7,992,261 B2 | 8/2011 | Hammerslag et al. | |
| 8,042,235 B2 * | 10/2011 | Wu | A44B 11/2526 24/641 |
| 8,277,401 B2 | 10/2012 | Hammerslag et al. | |
| 8,368,494 B2 | 2/2013 | Fiedler | |
| 8,381,362 B2 | 2/2013 | Hammerslag et al. | |
| 8,424,168 B2 | 4/2013 | Soderberg et al. | |
| 8,468,657 B2 | 6/2013 | Soderberg et al. | |
| 8,474,108 B2 | 7/2013 | Eisenberger | |
| 8,516,662 B2 | 8/2013 | Goodman et al. | |
| D691,879 S | 10/2013 | Bernard | |
| 8,713,820 B2 | 5/2014 | Kerns et al. | |
| 8,739,371 B2 | 6/2014 | Fiedler | |
| 8,794,682 B2 | 8/2014 | Fiedler | |
| 8,984,719 B2 | 3/2015 | Soderberg et al. | |
| 9,038,251 B1 * | 5/2015 | Bevilacqua | A44B 11/266 24/615 |
| 9,101,181 B2 | 8/2015 | Soderberg et al. | |
| 9,125,455 B2 | 9/2015 | Kerns et al. | |
| 9,138,030 B2 | 9/2015 | Soderberg et al. | |
| 9,149,089 B2 | 10/2015 | Cotterman et al. | |
| 9,179,729 B2 | 11/2015 | Cotterman et al. | |
| 9,248,040 B2 | 2/2016 | Soderberg et al. | |
| 9,259,056 B2 | 2/2016 | Soderberg et al. | |
| 9,261,726 B2 | 2/2016 | Shi et al. | |
| D751,281 S | 3/2016 | Nickel et al. | |
| D755,496 S | 5/2016 | Tulowitzki et al. | |
| 9,339,082 B2 | 5/2016 | Hammerslag et al. | |
| D758,061 S | 6/2016 | Whewell | |
| 9,375,053 B2 | 6/2016 | Burns et al. | |
| 9,408,437 B2 | 8/2016 | Goodman et al. | |
| D767,269 S | 9/2016 | Lovett et al. | |
| 9,439,477 B2 | 9/2016 | Neiley | |
| 9,486,039 B2 | 11/2016 | Ha | |
| 9,516,923 B2 | 12/2016 | Capra et al. | |
| D776,421 S | 1/2017 | Venturini | |
| 9,532,626 B2 | 1/2017 | Lovett et al. | |
| 9,581,292 B2 | 2/2017 | Kremer et al. | |
| 9,610,185 B2 | 4/2017 | Capra et al. | |
| 9,629,417 B2 | 4/2017 | Cavanagh et al. | |
| 9,680,131 B2 | 6/2017 | Huangfu et al. | |
| 9,681,705 B2 | 6/2017 | Trudel et al. | |
| 9,700,101 B2 | 7/2017 | Lovett et al. | |
| 9,706,814 B2 | 7/2017 | Converse et al. | |
| D794,316 S | 8/2017 | Tulowitzki et al. | |
| 9,737,115 B2 | 8/2017 | Soderberg et al. | |
| 9,743,714 B2 | 8/2017 | Hammerslag et al. | |
| 9,770,070 B2 | 9/2017 | Cotterman et al. | |
| 9,770,955 B2 | 9/2017 | Su | |
| 9,771,159 B1 * | 9/2017 | Grenga | B64D 17/38 |
| D799,810 S | 10/2017 | Mayberry | |
| 9,797,432 B2 | 10/2017 | Nkavesvaanit | |
| 9,854,873 B2 | 1/2018 | Kerns et al. | |
| 9,867,430 B2 | 1/2018 | Hammerslag et al. | |
| 9,872,568 B2 | 1/2018 | Capra et al. | |
| 9,872,790 B2 | 1/2018 | Capra et al. | |
| 9,918,865 B2 | 3/2018 | Nickel et al. | |
| 10,004,297 B2 | 6/2018 | Lovett | |
| 10,039,348 B2 | 8/2018 | Cavanagh et al. | |
| 10,070,695 B2 | 9/2018 | Burns et al. | |
| 10,076,160 B2 | 9/2018 | Burns et al. | |
| 10,085,517 B2 | 10/2018 | Beers et al. | |
| 10,123,589 B2 | 11/2018 | Soderberg et al. | |
| D835,898 S | 12/2018 | Lovett | |
| D835,976 S | 12/2018 | Nickel et al. | |
| 10,173,085 B2 | 1/2019 | Dehondt | |
| 10,174,784 B1 | 1/2019 | Cornay | |
| 11,044,970 B1 * | 6/2021 | Chan | A45C 13/30 |
| 11,564,457 B1 * | 1/2023 | Wu | A44B 11/2546 |
| 2003/0101553 A1 * | 6/2003 | Itoigawa | B60R 22/48 24/303 |
| 2005/0139739 A1 | 6/2005 | Hamerski | |
| 2007/0084026 A1 * | 4/2007 | Muromachi | A44B 11/2523 24/636 |
| 2007/0099469 A1 | 5/2007 | Sorensen | |
| 2007/0204442 A1 * | 9/2007 | Falb | A44B 11/25 24/633 |
| 2011/0138583 A1 | 6/2011 | Fiedler | |
| 2011/0298227 A1 | 12/2011 | Fiedler | |
| 2012/0124786 A1 | 5/2012 | Fiedler | |
| 2013/0221173 A1 | 8/2013 | Glover | |
| 2014/0250639 A1 * | 9/2014 | Siwak | A01K 27/005 24/303 |
| 2014/0298630 A1 * | 10/2014 | Hortnagl | A44B 11/006 24/697.2 |
| 2018/0094466 A1 | 4/2018 | Schneider et al. | |
| 2018/0160775 A1 | 6/2018 | Pollack et al. | |
| 2018/0249682 A1 | 9/2018 | Brian | |
| 2018/0310671 A1 | 11/2018 | Soderberg et al. | |
| 2018/0363328 A1 | 12/2018 | Huang | |
| 2019/0021447 A1 | 1/2019 | Whewell et al. | |
| 2019/0024698 A1 | 1/2019 | Berndorfer et al. | |
| 2020/0022463 A1 * | 1/2020 | Templeton | A44B 11/2526 |
| 2021/0037792 A1 * | 2/2021 | Glozbach De Cabarrus | F16B 21/04 |
| 2022/0015484 A1 * | 1/2022 | Pagano | A44B 11/263 |
| 2022/0295948 A1 * | 9/2022 | Chui | A44B 11/2569 |
| 2022/0349431 A1 * | 11/2022 | Haider | F16B 21/073 |
| 2023/0000214 A1 * | 1/2023 | Laszkiewicz | A44B 11/2573 |
| 2023/0061741 A1 * | 3/2023 | Mullin | F16B 45/04 |

FOREIGN PATENT DOCUMENTS

| | | |
|---|---|---|
| DE | 202011052397 U1 | 3/2012 |
| DE | 102010044144 B3 | 5/2012 |
| DE | 102016122879 A1 | 5/2018 |
| EP | 2389084 B1 | 5/2017 |
| FR | 2830264 B1 | 10/2005 |
| FR | 2972361 A1 | 9/2012 |
| JP | 2001221375 A | 8/2001 |
| JP | 2007068828 A | 3/2007 |
| JP | 2018130940 A | 8/2018 |
| KR | 20170055454 A | 5/2017 |
| WO | 2012036813 A1 | 3/2012 |
| WO | 2016029844 A1 | 3/2016 |
| WO | 2018039584 A1 | 3/2018 |
| WO | 2019192930 A1 | 10/2019 |

OTHER PUBLICATIONS

International Search Report and Written Opinion dated Oct. 22, 2021 for co-pending International Application No. PCT/US2021/037950; 13 pages.

* cited by examiner

MAGNETICALLY GUIDED LATCH

CROSS REFERENCE TO RELATED APPLICATIONS

This non-provisional application claims the benefit of provisional application having Ser. No. 63/040,752, filed Jun. 18, 2020, titled MAGNETICALLY GUIDED RING LATCH, the entirety of which is incorporated herein by reference.

TECHNICAL FIELD

The invention relates to latches.

BACKGROUND OF THE INVENTION

Latches are generally configured to secure members to be retained by the latch and are used in a variety of applications, such as dog leashes or helmet chin straps. Such latches generally require two hands to secure the member in the latch. For example, a first hand grasps the latch and opens it, a second hand grasps the member and inserts it into the latch while the first hand maintains the latch in the open configuration, and after the member is fully received in the latch, the first hand transitions the latch to a closed configuration to thereby secure the member in the latch. Accordingly, there is a need for easily securing members in latches with a single hand.

Latches also are generally configured to work with custom members to be secured such that latches for dog leashes do not generally work with other miscellaneous applications, such as helmet chin straps. Accordingly, there is also a need for latches that are configured to be more universally useful.

BRIEF SUMMARY OF THE INVENTION

It is therefore an object of the present invention to provide latches that facilitate simple single-handed use.

It is also an object of the present invention to provide latches that are universally useful with any bar that fits in a receiver channel of the latches.

It is another object of the present invention to provide latches that automatically latch upon receiving a latchable member.

It is a further object of the present invention to provide latches that, upon releasing the latchable member, automatically reset the latch for subsequent automatic latching.

The invention achieves the above objects, as well as other objects and advantages that will become apparent from the description that follows, by providing a latch. In a preferred embodiment, latch includes a housing and a catch. The housing defines a receiver channel that is configured to receive a latchable member. The catch is transitionable between an open configuration and a closed configuration. In the open configuration, the catch is configured to enable insertion of the latchable member into the receiver channel and to enable removal of the latchable member from the receiver channel. In the closed configuration, the catch is configured to at least partially close the receiver channel and to prevent removal of the latchable member from the receiver channel.

In some embodiments, the latch includes a trigger that is configured to transition from a retaining configuration to an actuated configuration responsive to the latchable member being received in the receiver channel and moving the trigger. In the retaining configuration, the trigger is configured to prevent the catch from transitioning from the open configuration to the closed configuration. In the actuated configuration, the trigger is configured to permit the catch to transition from the open configuration to the closed configuration.

Preferably, the catch is biased toward the closed configuration. In some embodiments, the trigger is biased toward the retaining configuration. In some embodiments, the latch includes a magnet configured to apply a magnetic force to the latchable member when the latchable member is received in the receiver channel and is in contact with the trigger. The magnetic force is greater than the bias of the trigger. In some embodiments, the latch includes a biasing member that is configured to bias the trigger toward the retaining configuration. In some embodiments, the magnet is disposed between the biasing member and the receiver channel.

In some embodiments, the catch is configured to prevent the trigger from transitioning from the actuated configuration to the retaining configuration when the catch is in the closed configuration. In some embodiments, the trigger includes a base and extension portions extending from opposite sides of the base toward the receiver channel. In some embodiments, the biasing member is configured to contact the base. In some embodiments, the extension portion is configured to extend into the receiver channel when the trigger is in the retaining configuration. In some embodiments, the magnet is disposed between the base and the receiver channel. In some embodiments, the magnet is disposed between the extension portions.

In some embodiments, the receiver channel defines a major dimension and a minor dimension. The major dimension and the minor dimension are substantially perpendicular to a direction in which the latchable member is received in the receiver channel. In some embodiments, the latchable member includes a bar that has a cross-sectional diameter that is no greater than the minor dimension of the receiver channel.

In some embodiments, the catch defines a smooth convex-shaped surface that is configured to extend entirely across one dimension of the receiver channel when the catch is in the closed configuration. In some embodiments, the smooth convex-shaped surface is configured to face the latchable member when the catch is in the closed configuration and the latchable member is in the receiver channel.

In some embodiments, the housing or the catch includes nylon.

In some embodiments, the housing has a catch limiter that is configured to contact the catch in the closed configuration and to prevent the catch from moving farther from the open configuration than the closed configuration. In some embodiments, the housing has two opposing walls that at least partially define the receiver channel. In some embodiments, the housing is configured to receive the latchable member between the first and second walls. In some embodiments, the first wall has the catch limiter. In some embodiments, each part of the catch is closer to the second wall than the first wall when the catch is in the open configuration.

The invention achieves the above objects, as well as other objects and advantages that will become apparent from the description that follows, by providing a dog leash or helmet strap that includes the latch.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS OF THE INVENTION

A latch in accordance with the principles of the invention is generally indicated at reference number 2 in the various figures of the attached drawings wherein numbered elements in the figures correspond to like numbered elements herein.

Figure 1:
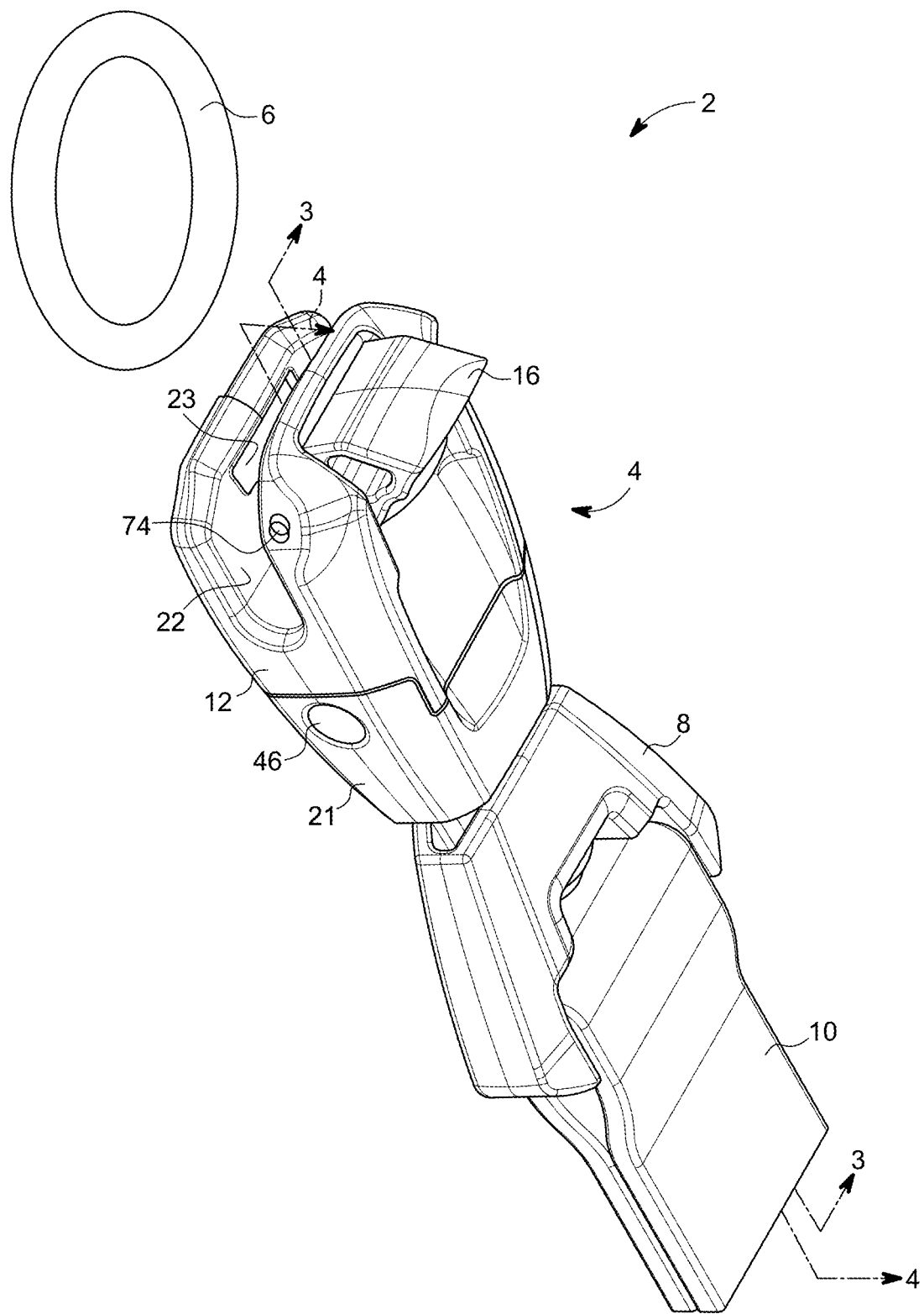
FIG. 1 is an isometric view of a first embodiment of a latch in accordance with the principles of the present invention.

FIG. 1 shows the latch 2 that includes a distal latch coupler 4 that is configured to receive, latch, and selectively release a latchable member 6 (for example, an O-ring, a D-ring, or a bar) to be secured in the latch coupler 4. As shown in FIG. 1, the latch coupler 4 is swivel-coupled to a proximal coupler 8 that is configured to couple to a proximal member 10 (for example, a leash, helmet chin strap, or tie-down strap). The latchable member 6 is configured to be coupled to or is a component of a device that a user desires to secure to the proximal member 10 (for example, a dog collar such as a choker collar, another helmet chin strap, or another tie-down strap). Accordingly, the latch coupler 4 facilitates releasably coupling the latchable member 6 to the proximal member 10.

Figure 2:
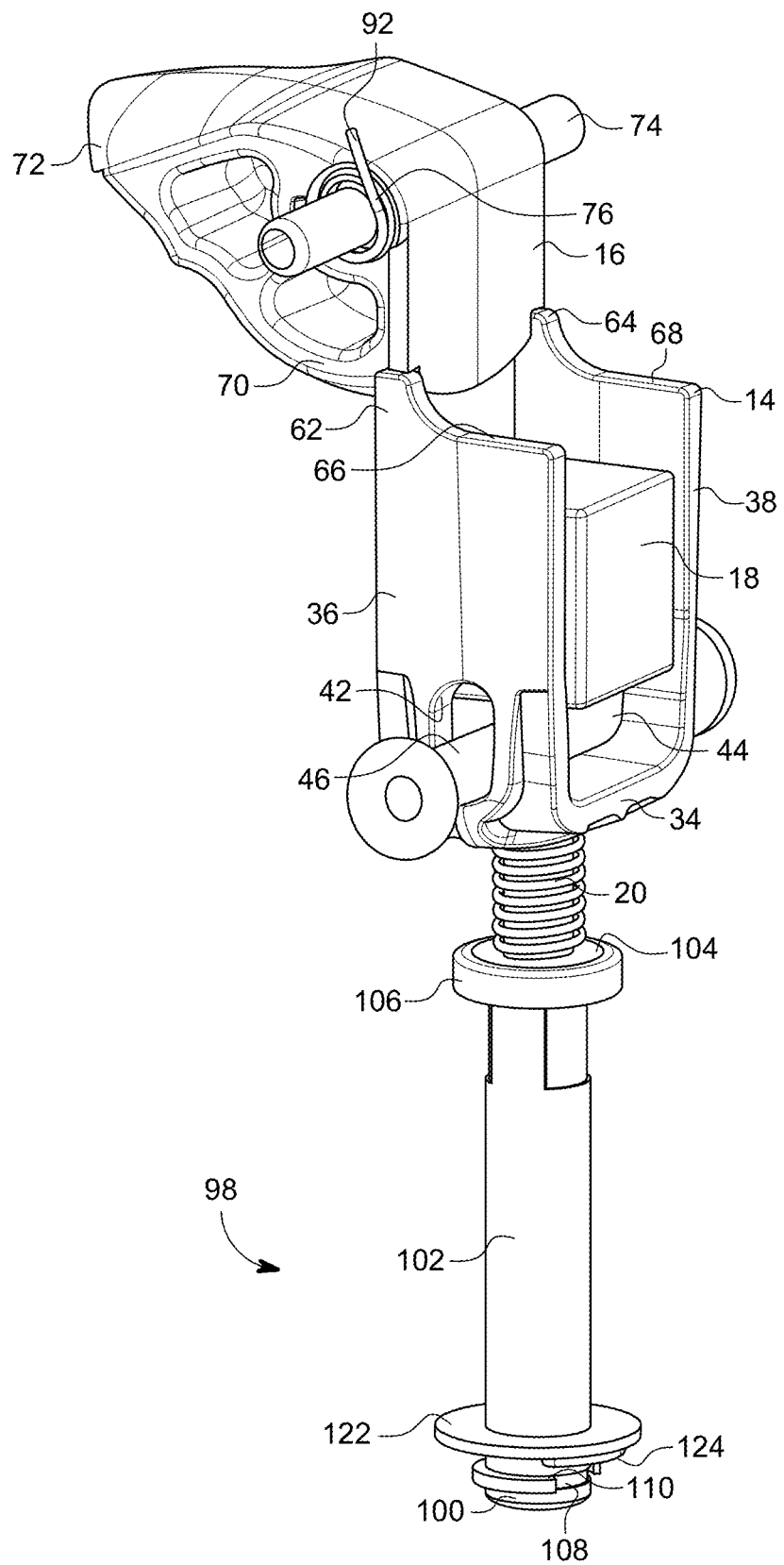
FIG. 2 is an isometric view of internal components of the latch of FIG. 1.
Figure 6:
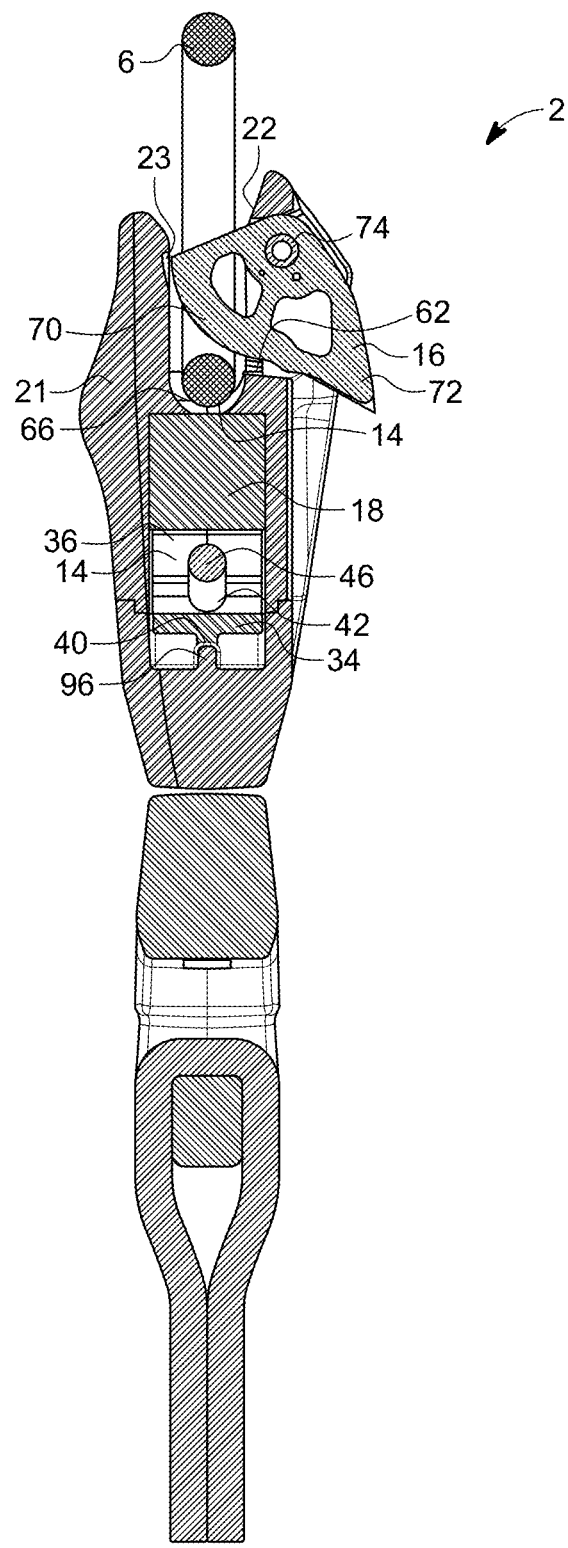
Figure 7:
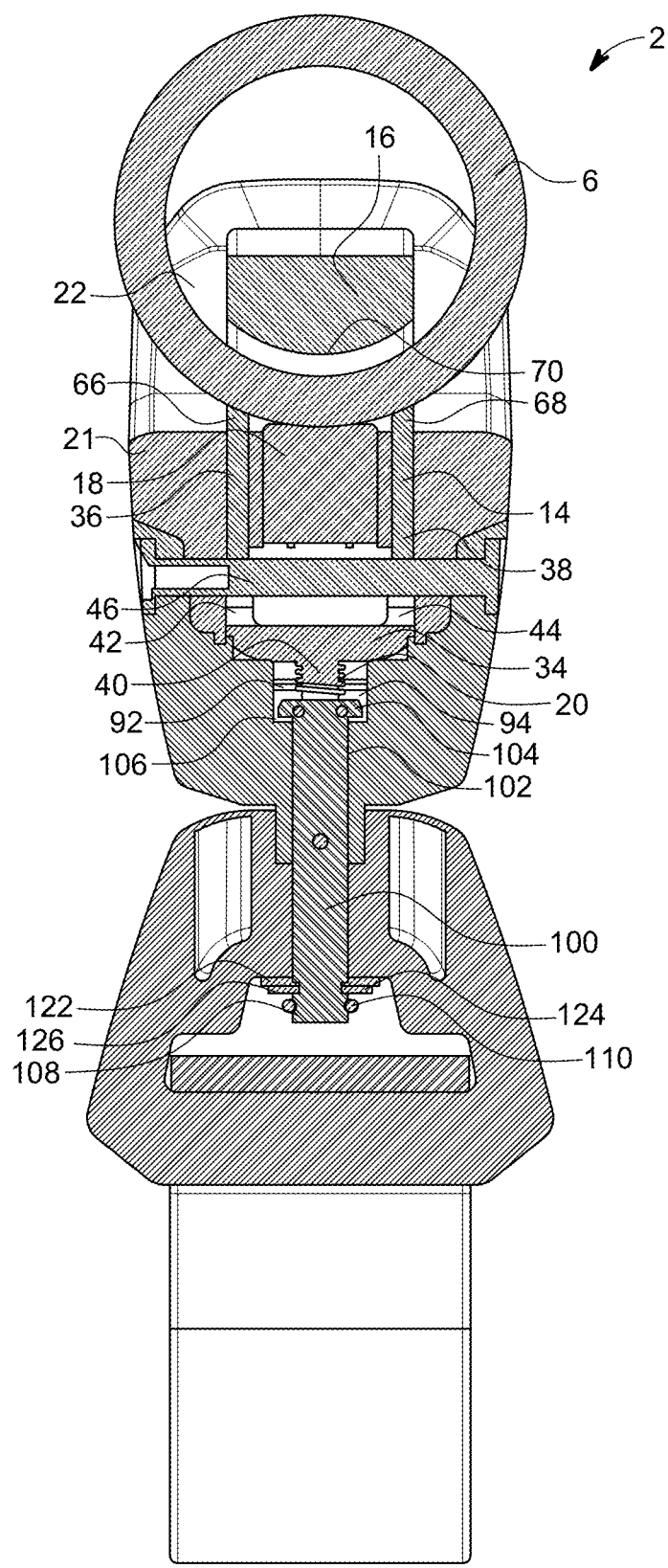
FIG. 7 is a cross-sectional view of the latch of FIG. 1, taken along line 4-4 while the latch is in the closed configuration.

Unlike a typical latch, the latch 2 is configured to automatically secure the latchable member 6 in the latch 2 responsive to receiving the latchable member 6. FIG. 2 shows components of the latch 2 that are internal to or coupled to the housing 12 shown in FIG. 1. In particular, the latch 2 has a trigger 14 that is configured to retain a closed-biased catch 16 in an open configuration as shown in FIGS. 1-5 until the latchable member 6 actuates the trigger 14 by transitioning the trigger 14 to the actuated configuration shown in FIGS. 6 and 7. Actuating the trigger 14 releases the catch 16, thereby enabling the catch 16 to move in accordance with its bias toward a closed configuration as shown in FIGS. 6 and 7 to facilitate automatically securing the latchable member 6 in the latch 2. Accordingly, the latch 2 facilitates releasably coupling the latchable member 6 to the proximal member 10 with single-handed operation because the user only needs to insert the latchable member 6 into the latch 2 with sufficient force to actuate the trigger 14.

Moreover, in some embodiments, the latch 2 has a magnet 18 that is configured to attract the latchable member 6 with a force sufficient to actuate the trigger 14, thereby further automating securing the latchable member 6 in the latch 2 responsive to the user placing the latchable member 6 in the latch 2. The trigger 14 is biased toward a retaining configuration as shown in FIGS. 2-5 in which the trigger 14 retains the catch 16 in the open configuration. The magnitude of the retaining-bias force is defined by a bias member 20 (for example, a compression spring such as a coil spring). The magnet 18 is selected such that, at least at the distance 32 (see FIG. 5) between the magnet 18 and the latchable member 6 when the latchable member 6 contacts the trigger 14 in the retaining configuration, the force of the magnetic attraction exceeds the retaining-bias force. Accordingly, the latch 2 facilitates releasably coupling the latchable member 6 to the proximal member 10 with single-handed operation because, in some embodiments, the user only needs to insert the latchable member 6 into the latch 2 a sufficient distance for the magnet 18 to attract the latchable member 6 with sufficient force to actuate the trigger 14.

In some embodiments, the magnetic-attraction force exceeds the retaining-bias force when the latchable member 6 is within 0.5, 1, 1.5, 2, 2.5, or 3 millimeters of the magnet 18. In some embodiments, the magnetic-attraction force exceeds the retaining-bias force when the latchable member 6 is within 0.25, 0.5, 0.75, or 1 times the cross-sectional diameter of the wire or bar section of the latchable member 6. In some embodiments, the latchable member 6 may be an O-ring with an outer diameter of 15, 20, 25, or 30 mm, and the cross-sectional diameter of the bar that defines the O-ring may be 3, 4, or 5 mm. The latchable member 6 (or at least a portion of the latchable member 6) preferably includes a ferrous metal. In alternate embodiments the latchable member may also include a magnet with its pole oriented to be attracted to the latch magnet 18. The magnet 18 held within the latch may include multiple magnets stacked in series (for example, on top of each other with their poles similarly oriented) or disposed in parallel to each other (for example, side-by-side to each other with their poles similarly oriented). In some embodiments, the magnet 18 provides approximately 10-12 pounds of force to the latchable member 6 if in contact with the latchable member 6. In some embodiments, the magnet 18 has a volume of approximately 900 cubic millimeters, preferably between 500 cubic mm and 2000 cubic mm. In some embodiments, the magnet 18 includes a rare-earth magnet. As shown in the Figures, the magnet 18 is directly exposed to the latchable member 6. In other embodiments, magnetically translucent material (for example, plastic) is disposed between the magnet 18 and the latchable member 6. For example, if the magnet 18 makes it difficult to remove the latchable member 6 from the latch 2, epoxy or another material may be coated on the magnet 18 to prevent direct contact with the latchable member 6.

The latch 4 is also configured to facilitate simple release of the latchable member 6 and to also facilitate automatically resetting the trigger upon releasing or moving the latchable member 6. In some embodiments, the catch 16 in the closed configuration prevents the trigger 14 from returning to the retaining configuration until the secured latchable member 6 is released. For example, the secured latchable member 6 or the catch 16 blocks the path of the trigger 14 to prevent the trigger 14 from returning to the retaining configuration while the catch 16 is in the closed configuration. To release the latchable member 6, the user moves the catch 16 in the direction opposite its bias and back into the open configuration (contrast the closed configuration of FIGS. 6 and 7 with the open configuration of FIGS. 1-5). With the catch 16 in the open configuration, the latchable member 6 is released and thus able to be removed from the latch 2. In embodiments where the force of the magnetic attraction of the latchable member 6 exceeds the retaining-bias force of the trigger, the user pulls the released latchable member 6 away from the magnet 18, thereby freeing the retaining-bias of the trigger 14 to move the trigger back into the retaining configuration. In embodiments without the magnet 18, the retaining-bias of the trigger 14 can move the trigger back into the retaining configuration without the user contacting the latchable member 6. Accordingly, the trigger 14 automatically reengages and retains the catch 16 upon releasing or moving the latchable member 6, thereby facilitating automatic preparation of the latch 2 for re-use.

Figure 3:
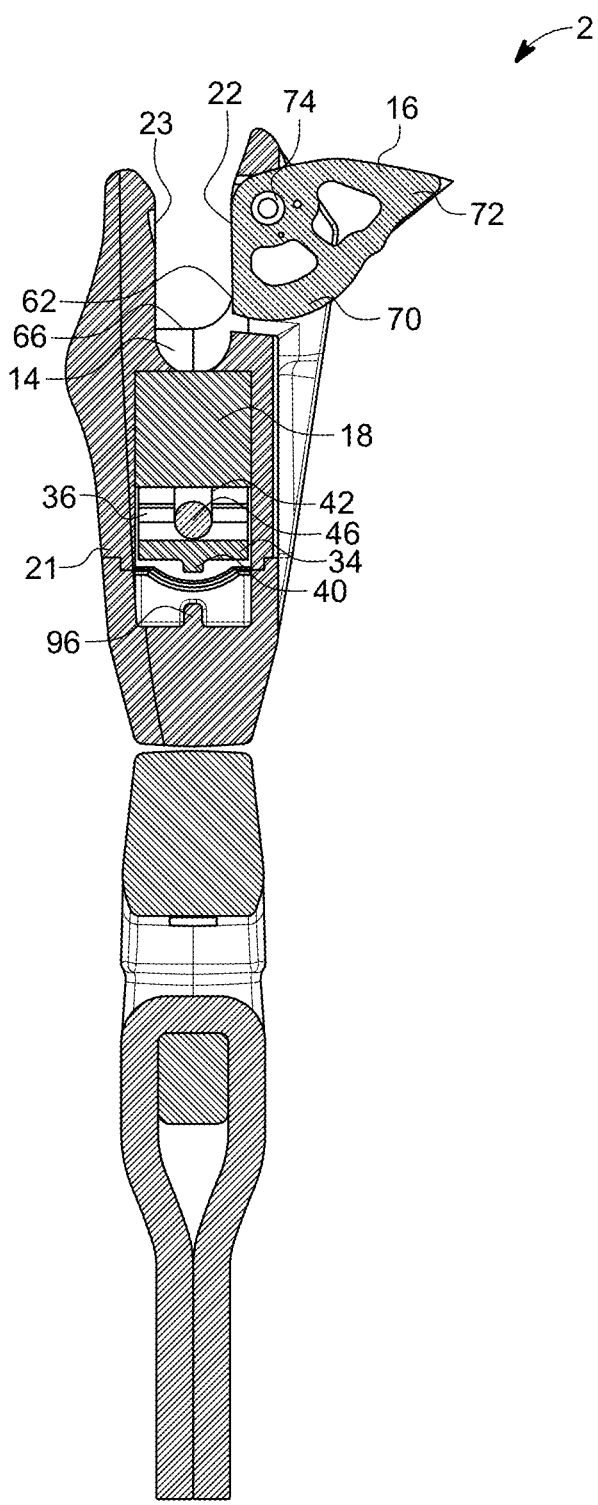
FIG. 3 is a cross-sectional view of the latch of FIG. 1, taken along line 3-3 in FIG. 1 while the latch is in an open configuration.

As shown in FIGS. 1, 3, and 6, the latch 2 includes a housing 21 that defines a receiver channel 22 that is configured to receive the latchable member 6. As shown in the Figures, the channel 22 is open on three sides. In other embodiments, the channel 22 is closed on five sides and open on only the side opposite the trigger 14 or the magnet 18. The end portion of the channel 22 that is opposite the trigger 14 or the magnet 18 is ramped or outwardly flared to facilitate guiding the latchable member 6 into the latch 2. Once in the latch 2 and after the catch 16 has transitioned to the closed configuration, the latchable member 6 is secured in the channel 22 by the catch 16 and the walls of the channel 22 (see FIGS. 6 and 7). In particular, the catch 16 and another portion of the latch 2 such as the housing 21 are configured to cooperatively prevent the catch 16 from moving beyond the closed configuration. As shown in FIG. 6, for example, the path through which the catch 16 travels is restrained such that the catch 16 cannot continue its path beyond the closed configuration.

As also shown in FIGS. 1, 3, and 6, the housing 21 defines a catch limiter 23 that is configured to contact the catch 16 in the closed configuration and prevent the catch 16 from moving beyond the closed configuration (see FIG. 6). As shown in the Figures, the catch limiter 23 includes a female member such as a recess in a wall of the channel 22, and in other embodiments, the catch limiter 23 includes a male member such as a protrusion from the wall of the channel 22 toward a central axis of the channel 22. In some embodiments, a flat wall of the channel defines the catch limiter 23 without a variation in the plane of the wall (see, for example, FIG. 16). The features that prevent the catch 16 from traveling beyond the closed configuration (for example, the path through which the catch 16 travels through the housing 21 or the catch limiter 23) can be configured to fail once a threshold force is applied to the latchable member 6 in a direction away from the trigger 14 and through the catch 16 (for example, approximately 100 pounds), thereby providing safety in the event of an accident such as a dog being caught in an elevator while the leash extends out of shut elevator doors. In some embodiments, the housing 21 or the catch 16 are configured to elastically deform and thus only temporarily fail upon such threshold being reached. For example, the housing 21 or the catch 16 may include nylon.

As shown in FIGS. 2, 4, 5, 7, and 8, the trigger 14 has a base portion 34 and two opposing extension portions 36, 38 that extend from the base portion 34 to define generally a U-shape. The base portion 34 defines a surface for the biasing member 20 to press and thereby bias the trigger 14 toward the retaining configuration. The base portion 34 has a biasing-member alignment member 40 that is configured to prevent the biasing member 20 from becoming misaligned in the latch 2. As shown in the Figures, the alignment member 40 includes a male protrusion that is received by the biasing member 20, and in other embodiments, the alignment member 40 includes a female member such as a recess that receives the biasing member 20.

As shown in FIGS. 2-8, the extension portions 36, 38 have respective throw limiters 42, 44 that are configured to limit the throw of the trigger 14 toward and away from the retaining configuration. As shown in the Figures, the throw limiters 42, 44 include female members such as slots that facilitate receiving a fixed male member 46 such as a pin, and in other embodiments, the throw limiters 42, 44 include male protrusions that are received by female members in the housing 21 of the latch 2 (see the housing 21 in FIG. 1).

As also shown in FIGS. 2-8, the extension portions 36, 38 have retaining arms 62, 64 that are configured to engage and retain the catch 16 when the trigger 14 is in the retaining configuration. The extension portions 36, 38 also have actuating portions 66, 68 that are configured to contact the latchable member 6 when it is received by the latch 2 and to transfer the force from the latchable member 6 to the remainder of the trigger 14, whereby such force is transferred to the biasing member 20 and thereby actuates the trigger 14.

As shown in FIGS. 2-4 and 6-8, the catch 14 has a catching portion 70 and a finger-engagement portion 72. The catching portion 70 is configured to trap the latchable member 6 in the latch 2 when the catch 16 is in the closed configuration (see FIGS. 6 and 7). As shown in the Figures, the catching portion 70 is smooth and convex to facilitate easily transitioning the catch 16 from the closed configuration to the open configuration, and in other embodiments, the catching portion 70 includes a recess that is configured to prevent transitioning the catch 16 from the closed configuration to the open configuration until the user presses the latchable member 6 farther into the latch 2 to remove the latchable member 6 from such recess.

The finger-engagement portion 72 is configured to transition the catch 16 to the open configuration (see FIGS. 1-5) when moved by a user's finger (or another device such as a pin). The catch 14 is configured to pivot about a pin 74 (see FIGS. 1-3, 6, and 8), and a biasing member 76 (see FIGS. 2 and 8) biases the catch 16 to move toward the closed configuration (see FIGS. 6 and 7). In the figures, the biasing member 76 is a torsion spring that is configured to have one end portion 80 received in a recess 78 defined by the catch 16 (see FIG. 8) while the other end portion 92 presses against the housing 21 to bias the catch 14.

Figure 4:
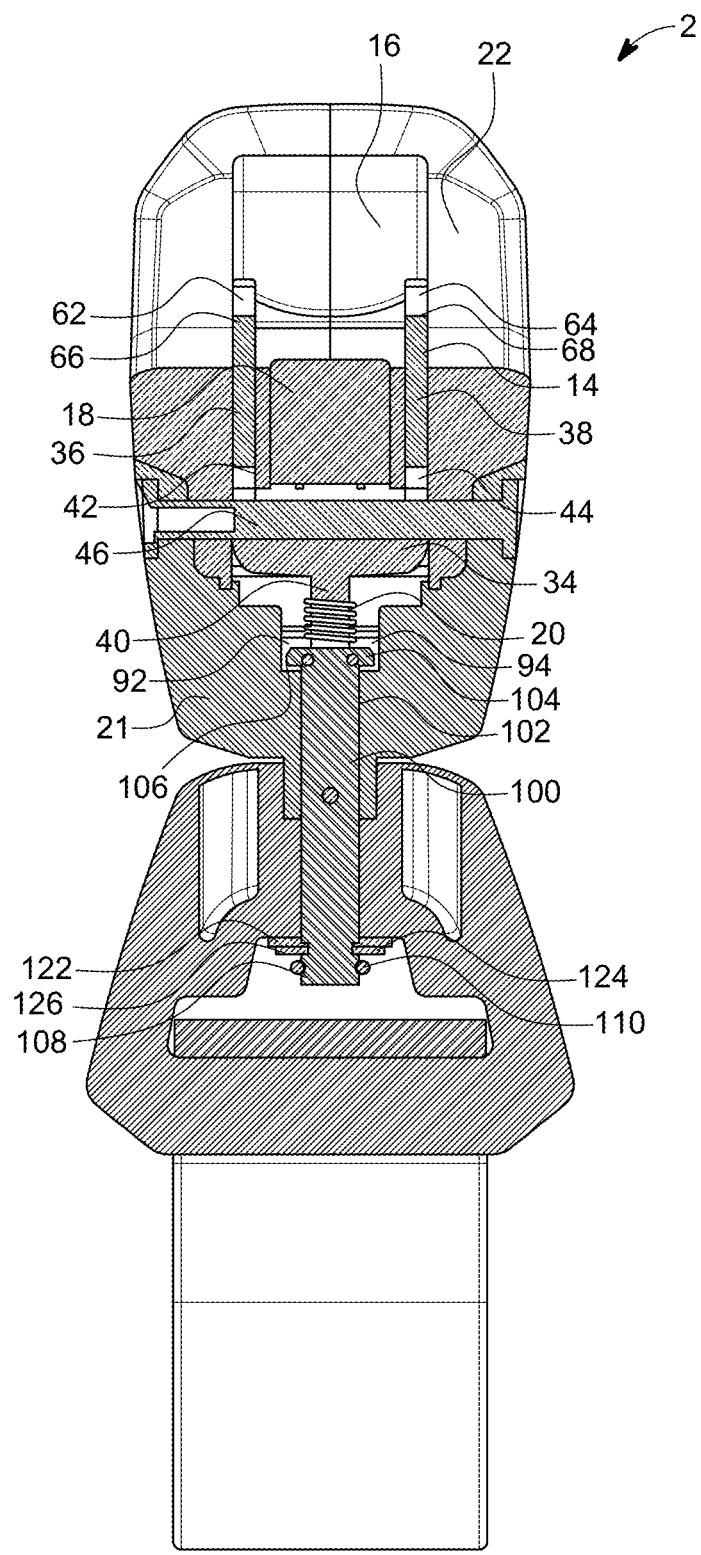
FIG. 4 is a cross-sectional view of the latch of FIG. 1, taken along line 4-4 in FIG. 1 while the latch is in the open configuration.
Figure 5:
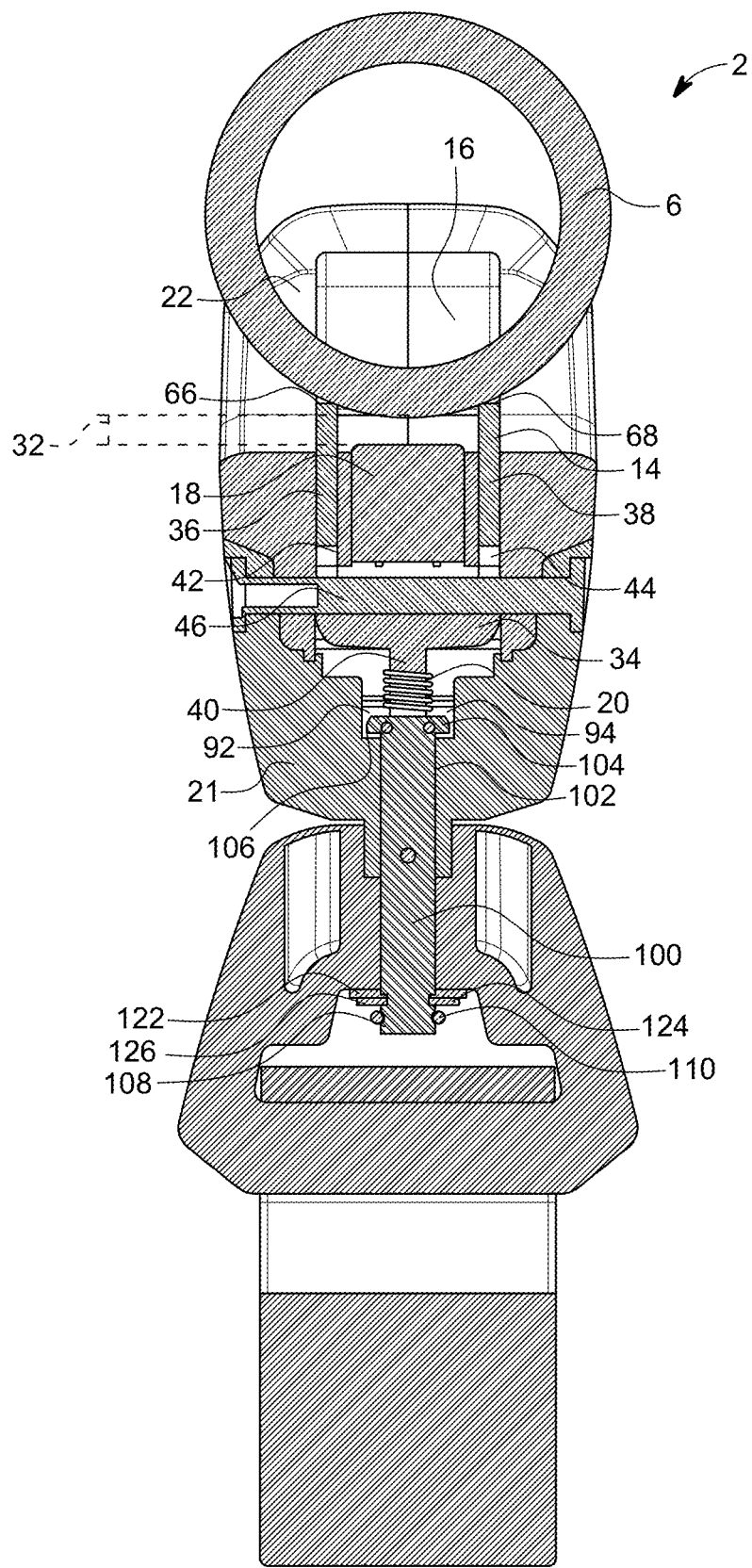
FIGS. 5 and 6 are cross-sectional views of the latch of FIG. 1, taken along line 3-3 while the latch is in a closed configuration.

As shown in FIGS. 4, 5, and 7, the latch housing 21 has a biasing-member alignment member 92 that is configured to prevent the biasing member 20 from becoming misaligned in the latch 2. As shown in the Figures, the alignment member 92 includes a female member where the housing 21 defines a recess 94 and protrusions (for example, the protrusion 96 shown in FIGS. 3 and 6) on outer sides of the biasing member 20, and in other embodiments, the alignment member 92 includes a male member such as a protrusion that is received in the biasing member 20.

Figure 8:
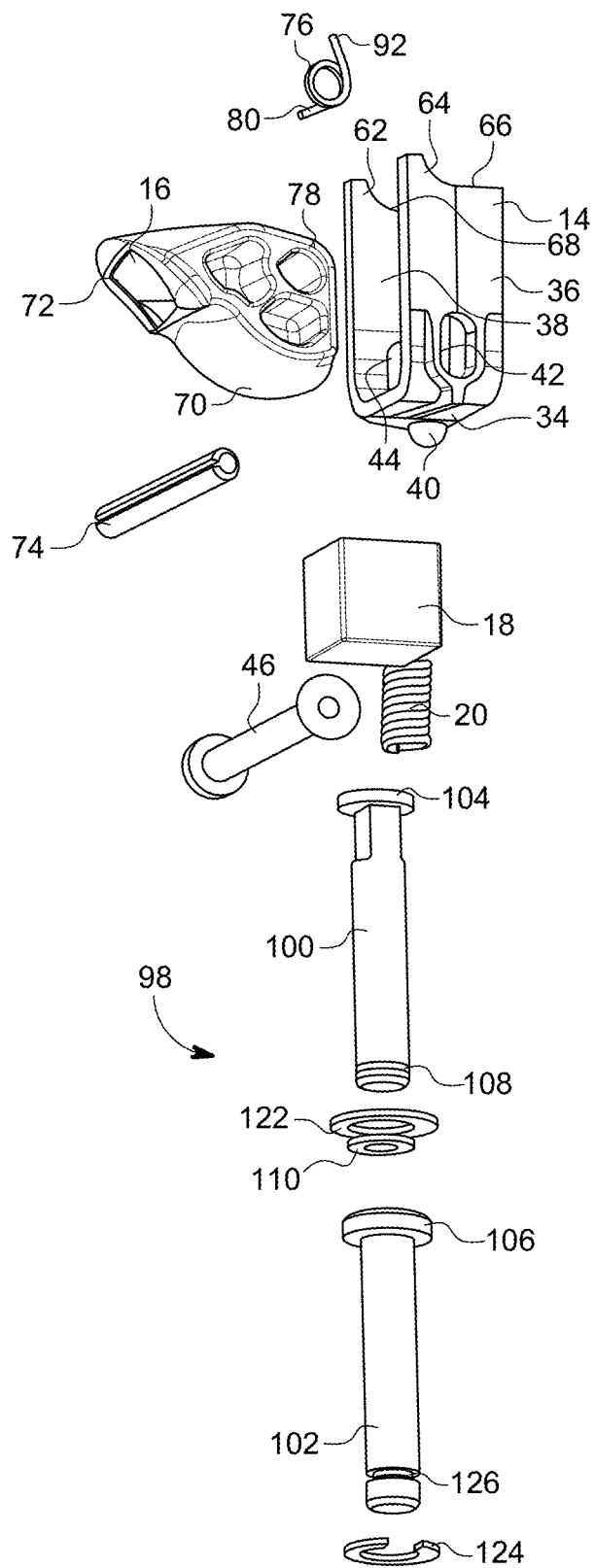
FIG. 8 is an isometric exploded view of the internal components of FIG. 2.

As shown in FIGS. 2, 4, 5, 7, and 8, in some preferred embodiments, a swivel coupler 98 pivotally couples the latch coupler 4 to the proximal coupler 8. As shown in FIG. 8, the swivel coupler 98 includes a male rod 100 (for example, a clevis pin) and a female tube 102 (for example, a hollow clevis pin having an inner diameter that is at least as large as the outer diameter of the male rod 100) that is configured to receive the male tube 100. Although FIGS. 2 and 8 show the female tube 102 separately from the housing 21 for ease of understanding, the housing 21 preferably defines the female tube 102. As shown in FIG. 2, the male rod 100 is longer than the female tube 102 such that, when a flange 104 of the male rod 100 is received by a recess 106 disposed at one end portion of the female tube 102, a grooved portion 108 of the male rod 100 extends out the opposite end portion of the female tube 102. The grooved portion 108 of the male rod 100 is configured to receive a tube-retaining member 110 such as a C-clip or an E-clip after the grooved portion 108 extends through the female tube 102, thereby retaining the male rod 100 in the female tube 102. Before placing the tube-retaining member 110 on the male rod 100, a washer 122 is placed on the female tube 102, and a washer-retaining member 124 such as an E-clip or a C-clip is coupled to the female tube 102 such as in a groove 126 at the end portion of the female tube 102 that is opposite the flange 106. Accordingly, as shown in FIGS. 4, 5, and 7, the swivel coupler 98 facilitates pivotally clamping the housing 21 of the latch coupler 4 to the proximal coupler 8 between the flange 106 of the female tube 102 and the washer 122. Some embodiments do not include the swivel coupler 98, but clamp without the added swivel.

Figure 9:
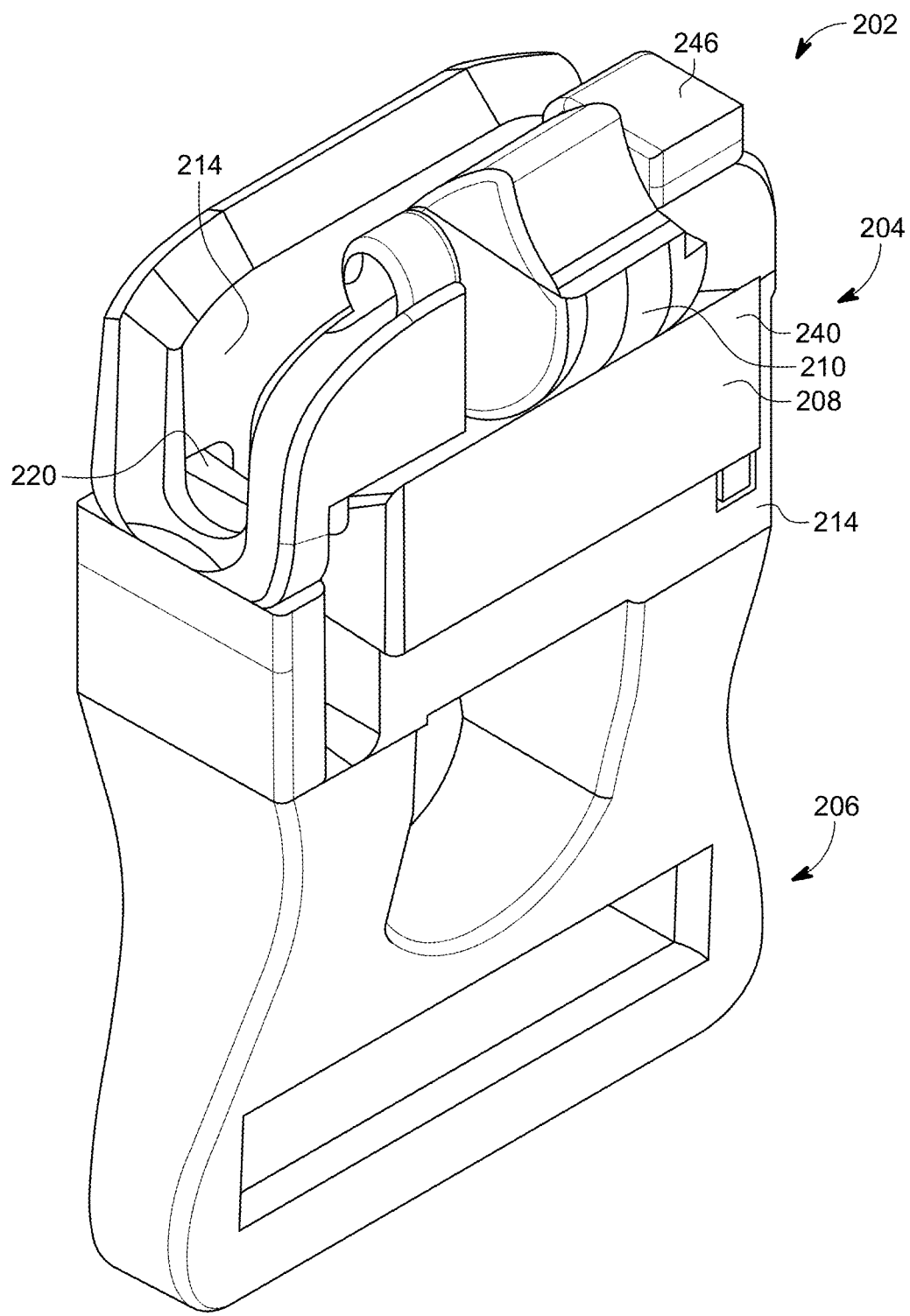
FIG. 9 is an isometric view of a second embodiment of a latch in accordance with the principles of the present invention.

FIGS. 9-16 show a second embodiment of a latch 202 in accordance with the principles of the invention. The latch 202 includes a latch coupler 204 is configured to receive, latch, and selectively release a latchable member (for example, an O-ring, a D-ring, or a bar) (see FIGS. 15 and 16) to be secured in the latch coupler 204. As shown in FIG. 9, the latch coupler 204 is fixedly coupled to a proximal coupler 206 that is configured to couple to a proximal member (for example, a leash, helmet chin strap, or tie-down strap) (not shown). The latchable member is configured to be coupled to or is a component of a device that a user desires to secure to the proximal member (for example, a dog collar such as a choker collar, another helmet chin strap, or a tie-down strap). Accordingly, the latch 202 facilitates releasably coupling the latchable member to the proximal member.

Similar to the latch 2, the latch 202 is configured to automatically secure the latchable member in the latch 202 responsive to receiving the latchable member. The latch 202 has a trigger 208 that is configured to retain a closed-biased catch 210 in an open configuration as shown in FIGS. 9-12 and 14 until the latchable member actuates the trigger 208 by moving it to the actuated configuration shown in FIGS. 15 and 16. Unlike the trigger 14 of the latch 2, however, the trigger 208 is defined by a pivoting member rather than a translating member.

Figure 10:
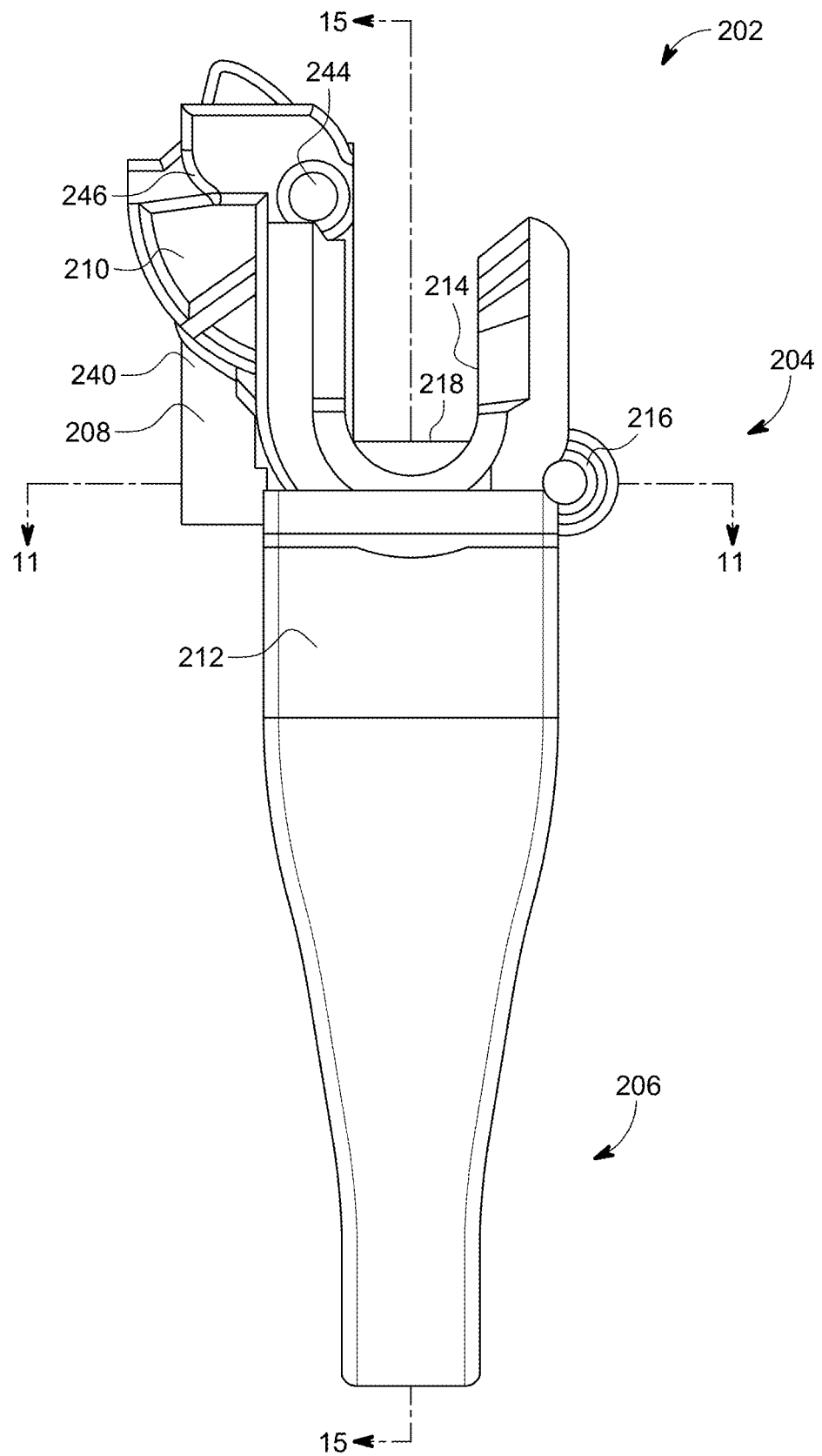
FIG. 10 is a side elevational view of the latch of FIG. 9.
Figure 11:
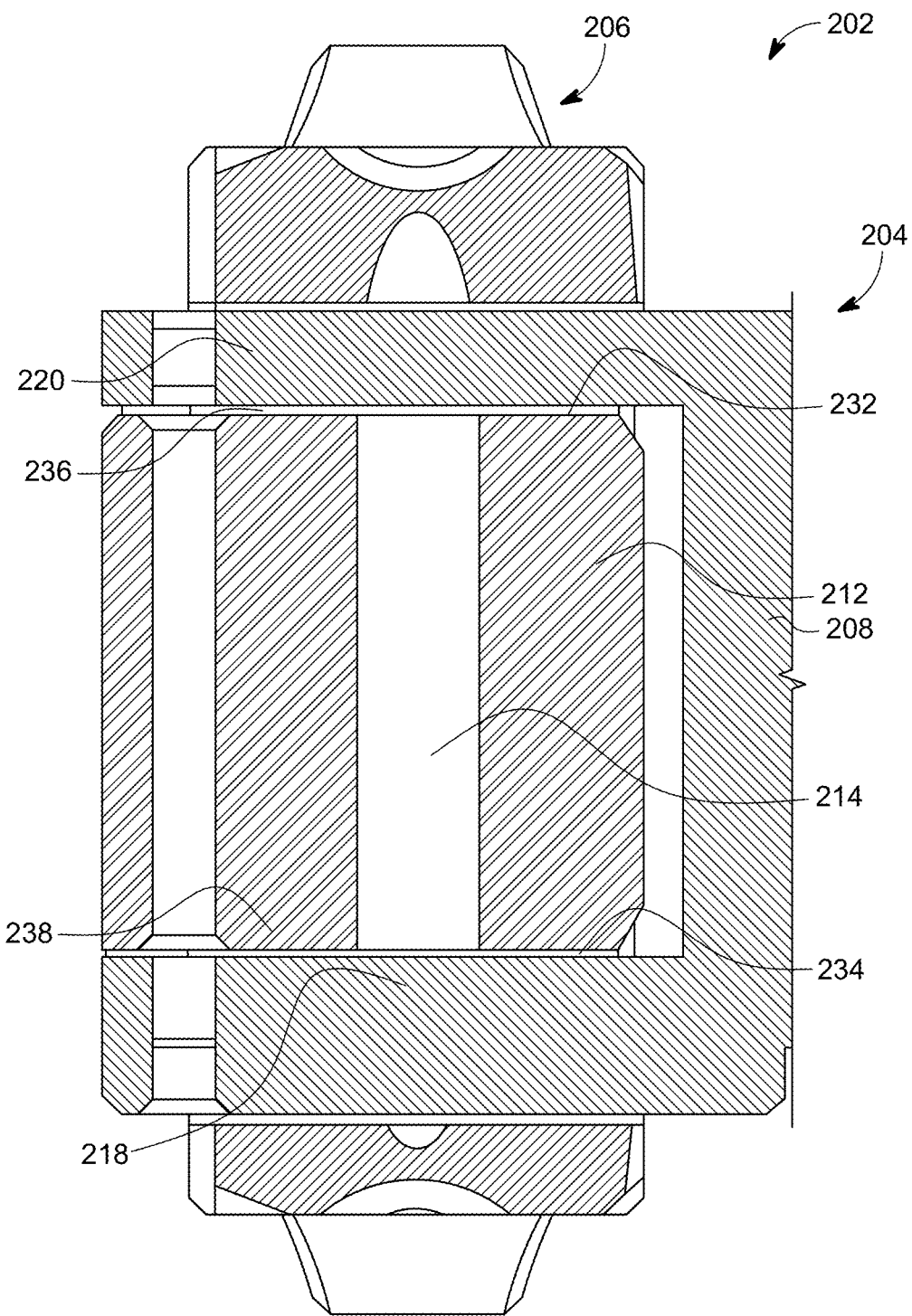
FIG. 11 is a cross-sectional view of the latch of FIG. 9, taken along the line 11-11 in FIG. 10 while the latch is in an open configuration.
Figure 12:
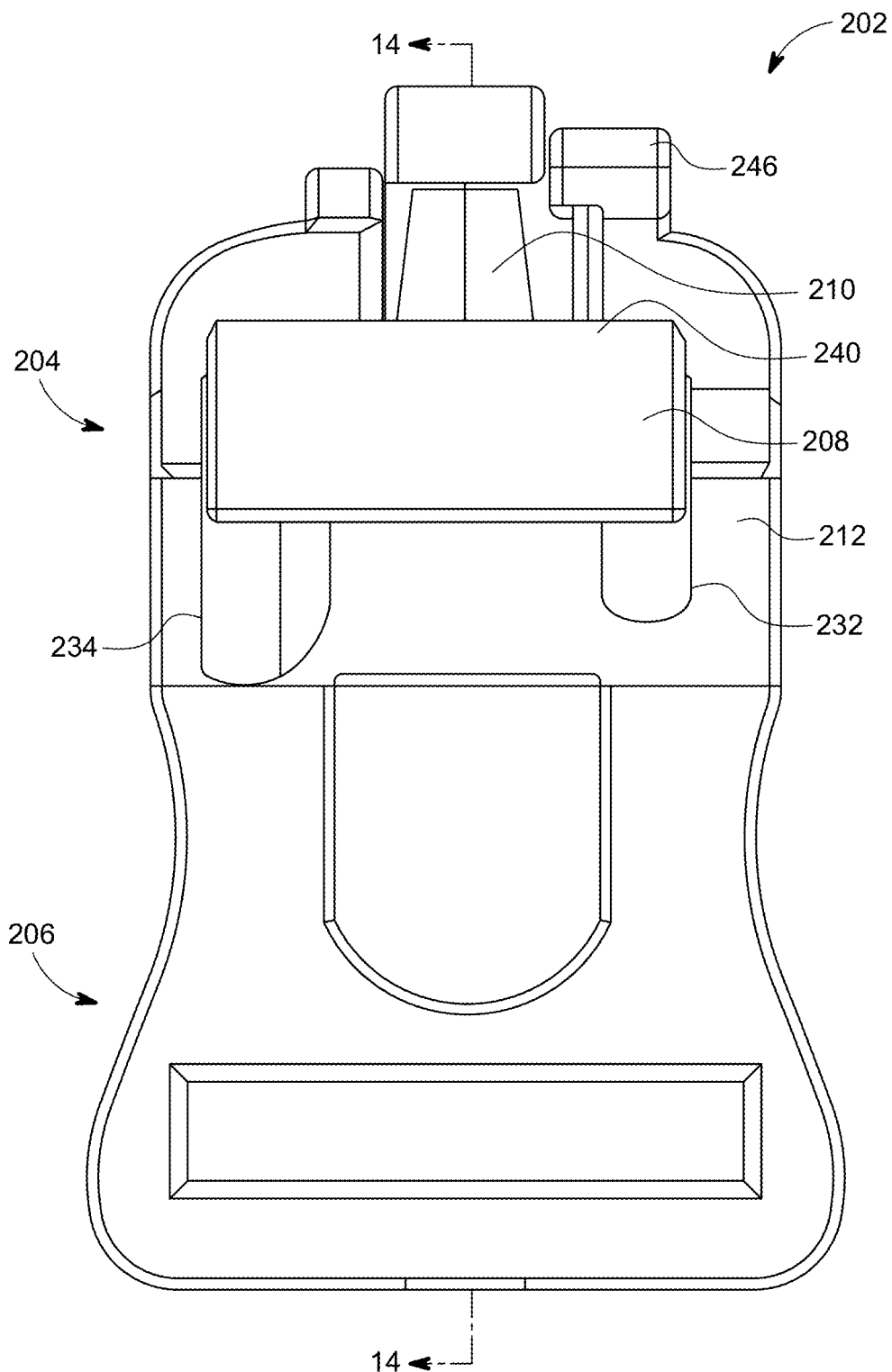
FIG. 12 is a front elevational view of the latch of FIG. 9.
Figure 13:
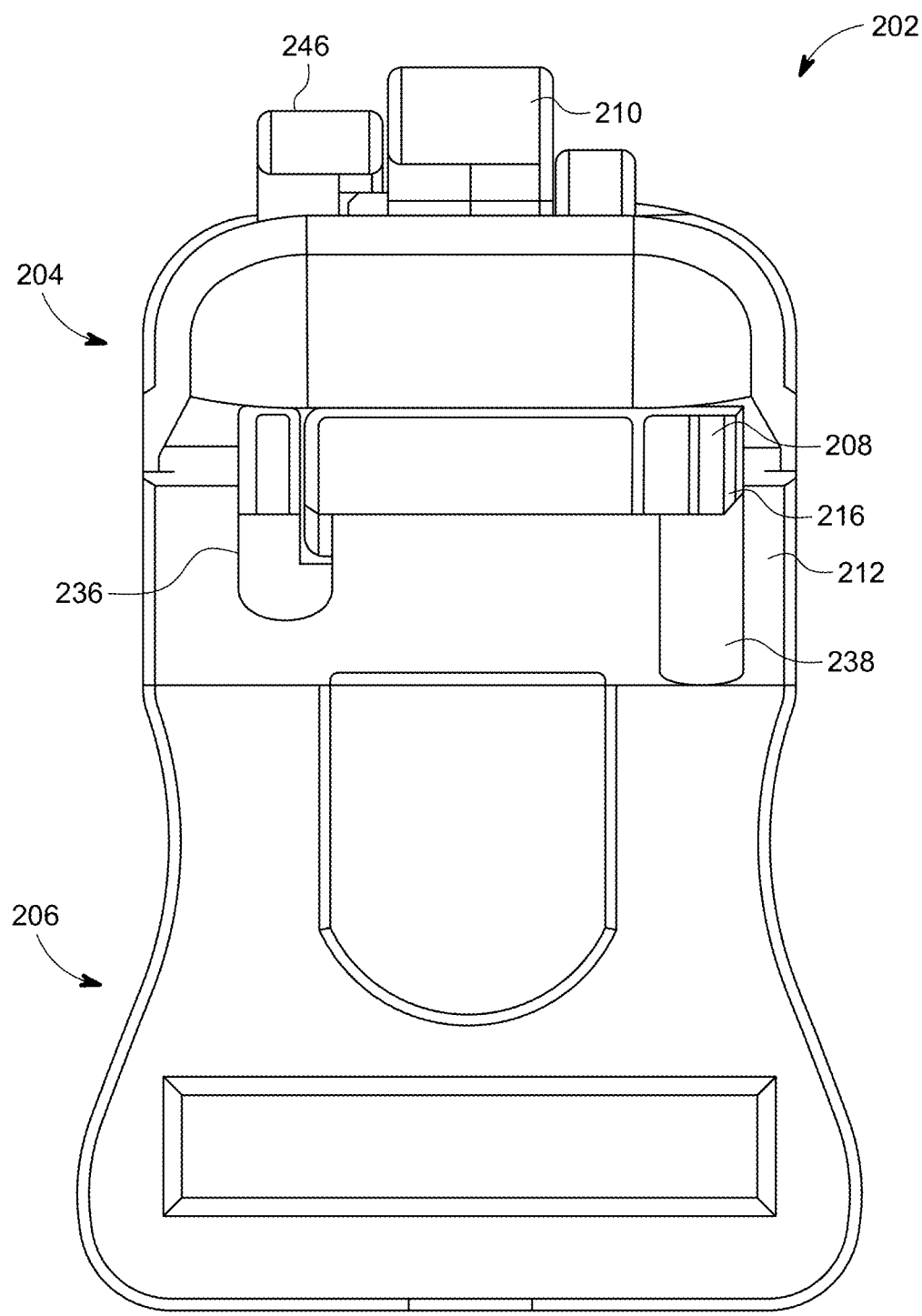
FIG. 13 is a rear elevational view of the latch of FIG. 9.

As shown in FIG. 10, the latch 202 has a housing 212 that defines a receiver channel 214 that is configured to receive the latchable member. The trigger 208 is configured to pivot about or with a male member 216 such as a pin that is disposed opposite the channel 214 from the catch 210 in the closed configuration. In other embodiments, the trigger 208 defines male members that extend into female members to facilitate the trigger 208 pivoting in such female members. As shown in FIGS. 10 and 11, the trigger 208 extends from the pivot point defined by the male member 216 through the housing 212 and the channel 214 to the external side of the housing 212 that is opposite the channel 214 from the pivot point defined by the male member 216. The portions of the trigger 208 that are disposed in the channel 214 define respective actuating portions 218, 220 (see FIG. 10 for the actuating portion 218 and FIGS. 9 and 14 for the actuating portion 220). When the latchable member depresses the actuating portions 218, 220, the trigger 208 pivots about the pivot point defined by the male member 216, and travels through pathways 232, 234, 236, 238 (for example, slots) (see FIGS. 11 and 12) defined in the housing 212.

Figure 14:
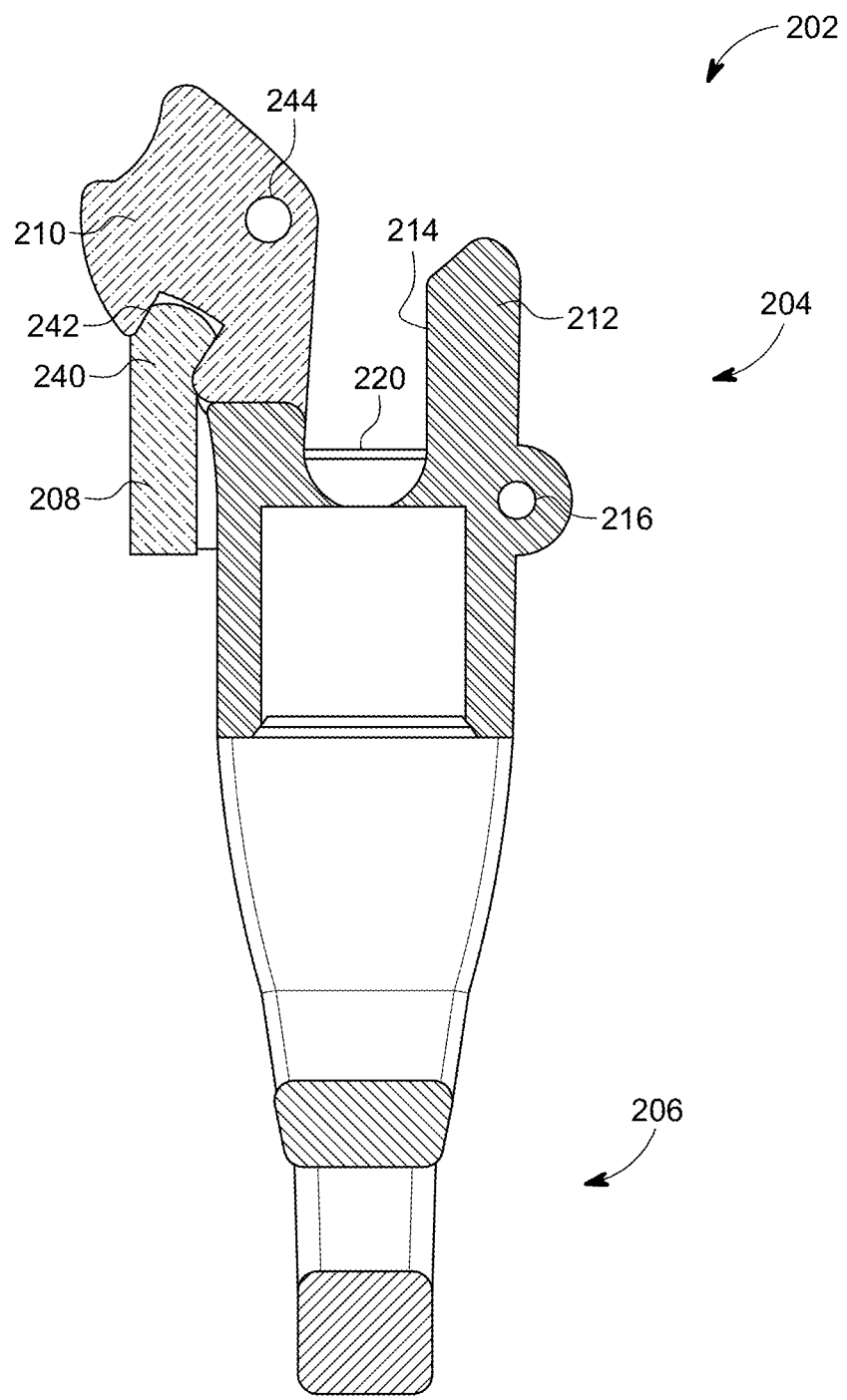
FIG. 14 is a cross-sectional view of the latch of FIG. 9, taken along the line 14-14 in FIG. 12 while the latch is in the open configuration.
Figure 15:
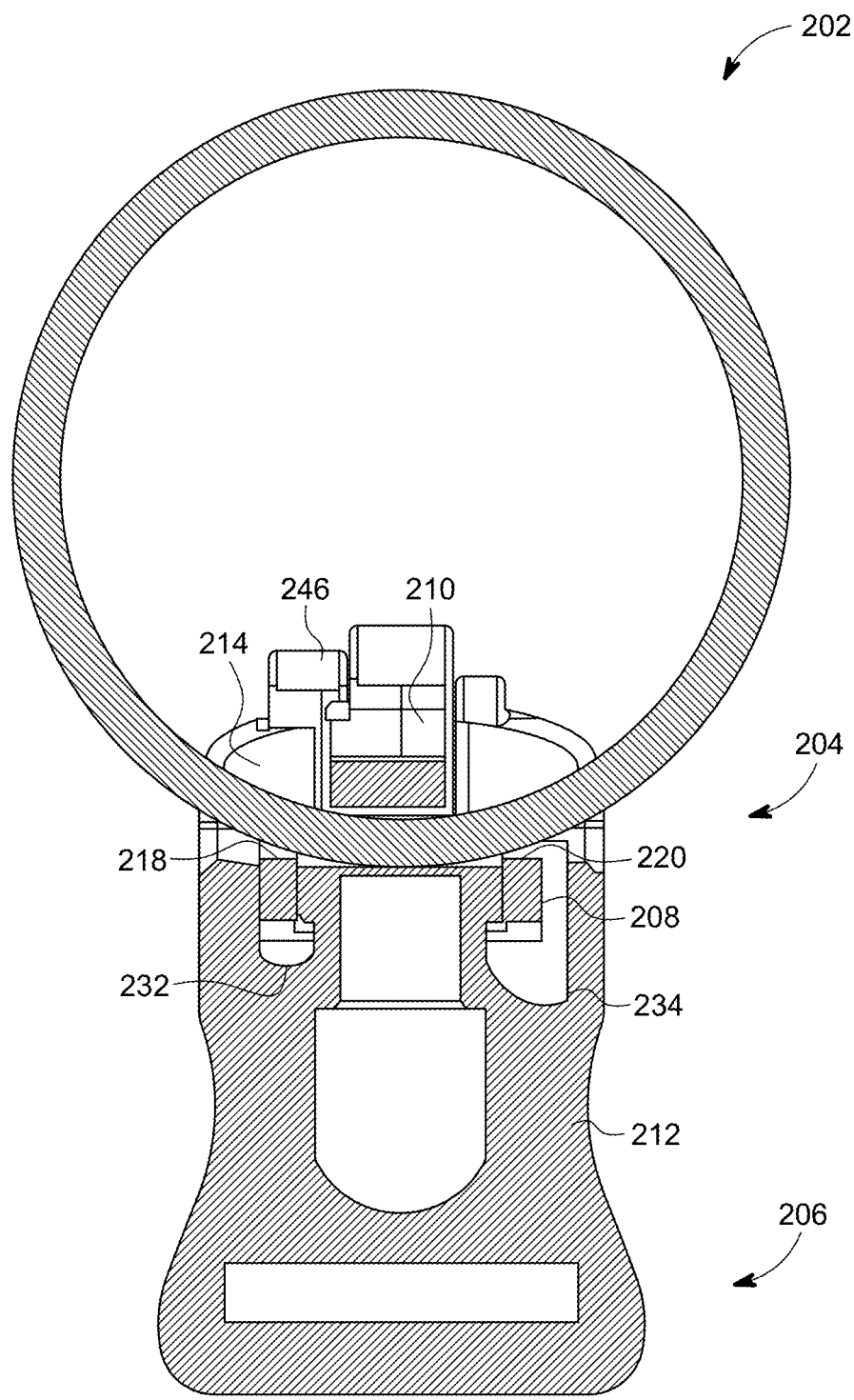
FIG. 15 is a cross-sectional view of the latch of FIG. 9, taken along the line 13-13 in FIG. 10 while the latch is in a closed configuration.
Figure 16:
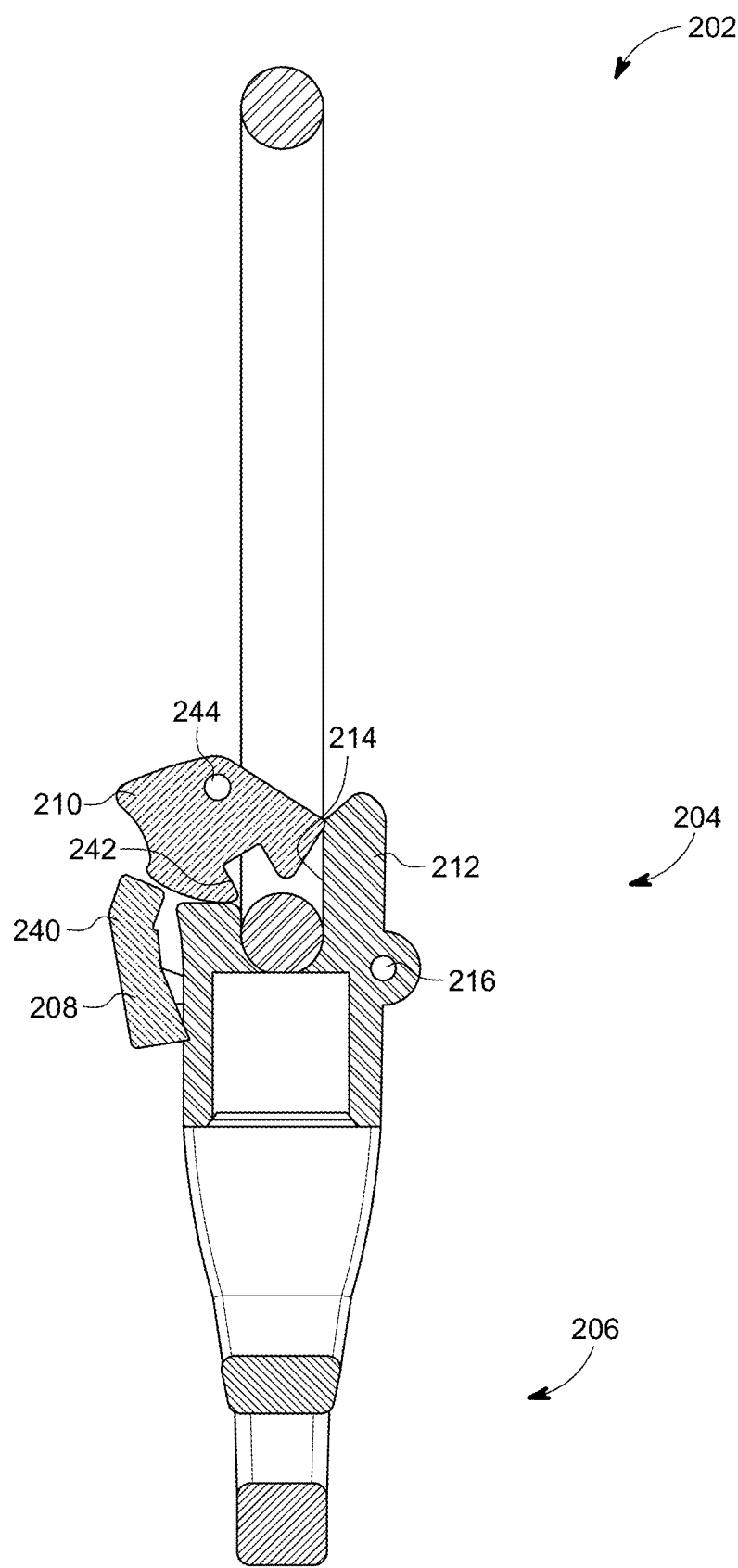
FIG. 16 is a cross-sectional view of the latch of FIG. 9, taken along the line 14-14 in FIG. 12 while the latch is in the closed configuration.

As shown in FIG. 14, the trigger 208 defines a retaining arm 240 external to the housing 212 and opposite the channel 214 from the pivot point defined by the male member 216. The trigger 208 is biased toward the retaining configuration shown in FIGS. 9-14 by a biasing member (for example, a compression spring or a torsion spring) (not shown). The catch 210 is biased toward the closed configuration shown in FIGS. 15 and 16. As shown in FIG. 14, the retaining arm 240 in the retaining configuration retains the catch 210 in the open configuration shown in FIGS. 9-14. As shown in the Figures, the catch 210 defines a recess 242 that is configured to receive the retaining arm 240. As shown in FIGS. 15 and 16, when the latchable member is received in the latch 202 and thereby actuates the trigger 208, the trigger 208 pivots and displaces the retaining arm 240, thereby permitting the catch 210 to travel to the closed configuration, such as by pivoting about a pivot point defined by a male member 244 such as a pin. In other embodiments, the catch 210 defines male members that extend into female members of the housing 212 to facilitate the catch 210 pivoting in such female members. In the closed configuration, the catch 210 contacts the wall of the channel 214 that is opposite the pivot point defined by the male member 244, thereby securing the latchable member in the latch 202.

The distance between the actuating portions 218, 220 and the retaining arm 240 in combination with the pivoting action of the trigger 208 provides a mechanical advantage and facilitates increased throw at the retaining arm 240. The pivoting of the retaining arm 240 compared with translation of other triggers facilitates increased robustness and reduced concern over smoothness of inner surfaces, tolerances, and misaligned components.

As shown in FIGS. 9, 10, 12, 13, and 15, the catch 210 has a finger-engagement portion 246 that enables the user to move the catch 210 from the closed configuration to the open configuration by pressing the member 246 and thereby pivoting the catch about the pivot point defined by the member 244. When the catch 210 reaches the closed configuration, the retaining arm 240 aligns with the recess 242, and the retaining bias of the trigger 208 moves the retaining arm 240 back into engagement with the recess 242 of the catch 210, thereby retaining the catch 210 until the next insertion of the latchable member.

Figure 17:
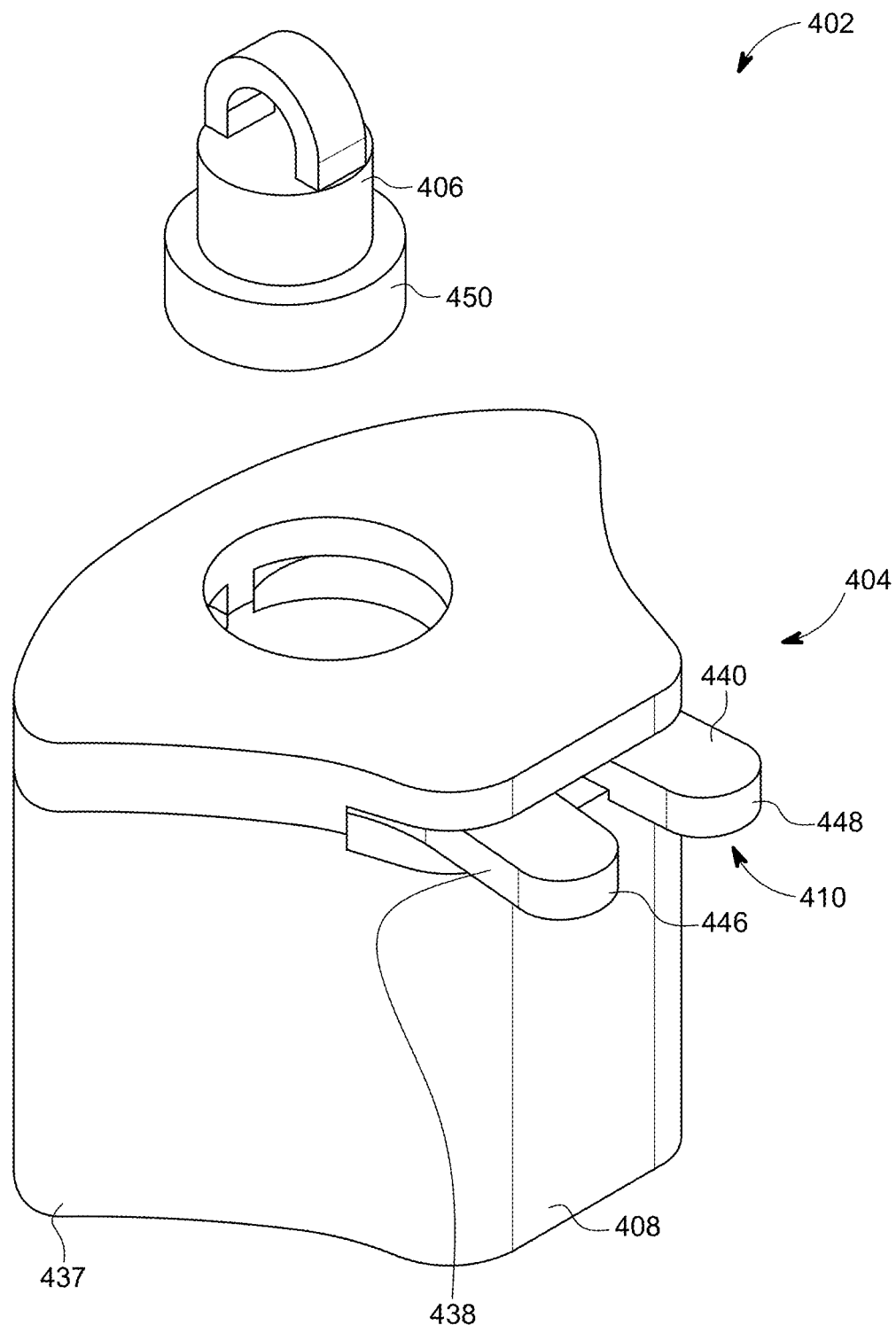
FIG. 17 is an isometric view of a fourth embodiment of a latch in an open configuration in accordance with the principles of the present invention.

FIG. 17 shows a fourth embodiment of a latch 402 in accordance with the principles of the invention. The latch 402 includes a latch coupler 404 is configured to receive, latch, and selectively release a latchable member 406 (for example, a flange end portion of a bar) to be secured in the latch coupler 404. The proximal end portion 408 of the latch coupler 404 is configured to couple to a proximal coupler (not shown) that is configured to couple to a proximal member (for example, a leash, helmet chin strap, mounting bracket, or tie-down strap) (not shown). The latchable member 406 is configured to be coupled to or is a component of a device that a user desires to secure to the proximal member (for example, a dog collar such as a choker collar, another helmet chin strap, or a tie-down strap). Accordingly, the latch 402 facilitates releasably coupling the latchable member to the proximal member.

Figure 18:
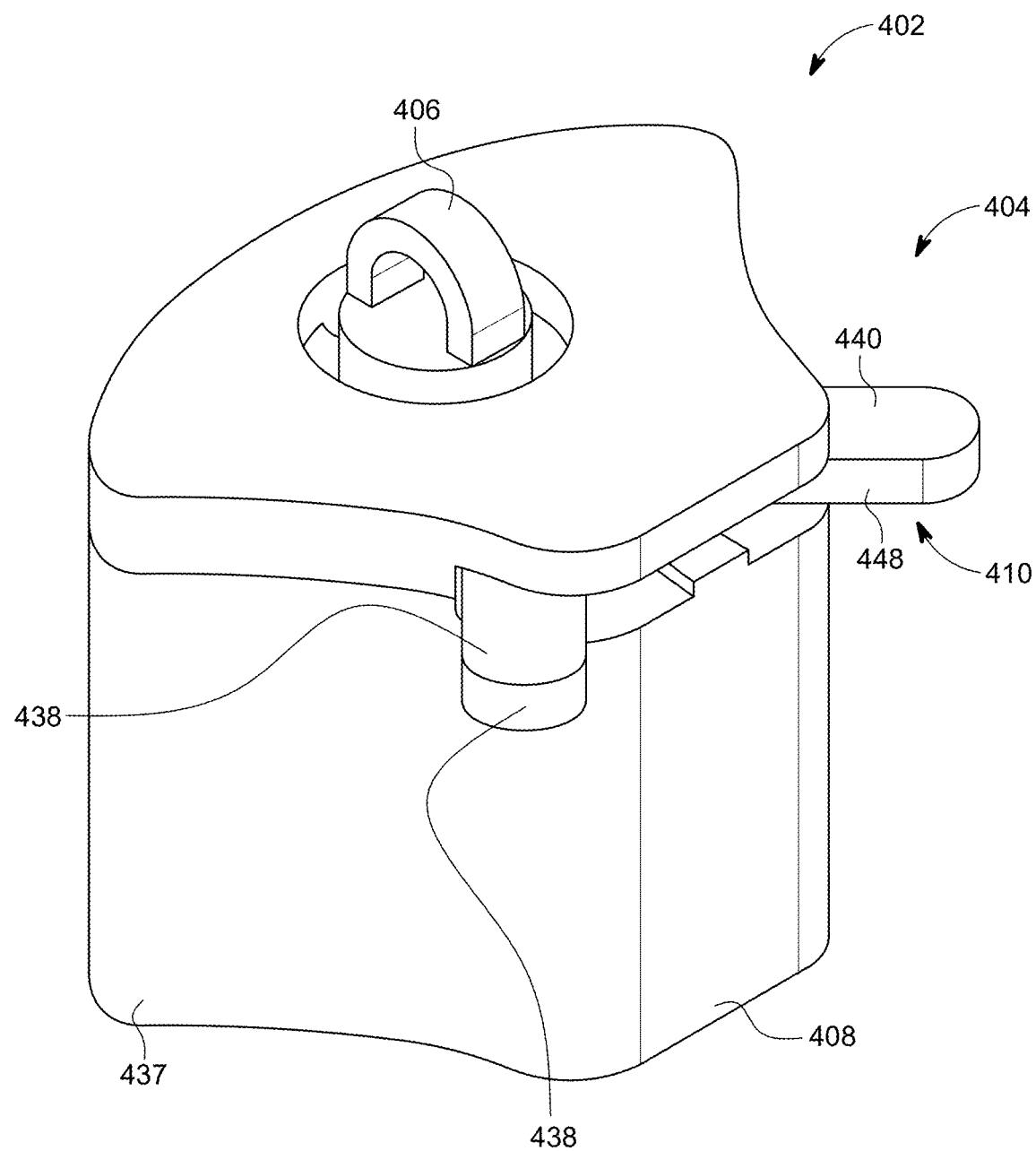
FIG. 18 is an isometric view of the latch of FIG. 17 in a closed configuration.
Figure 19:
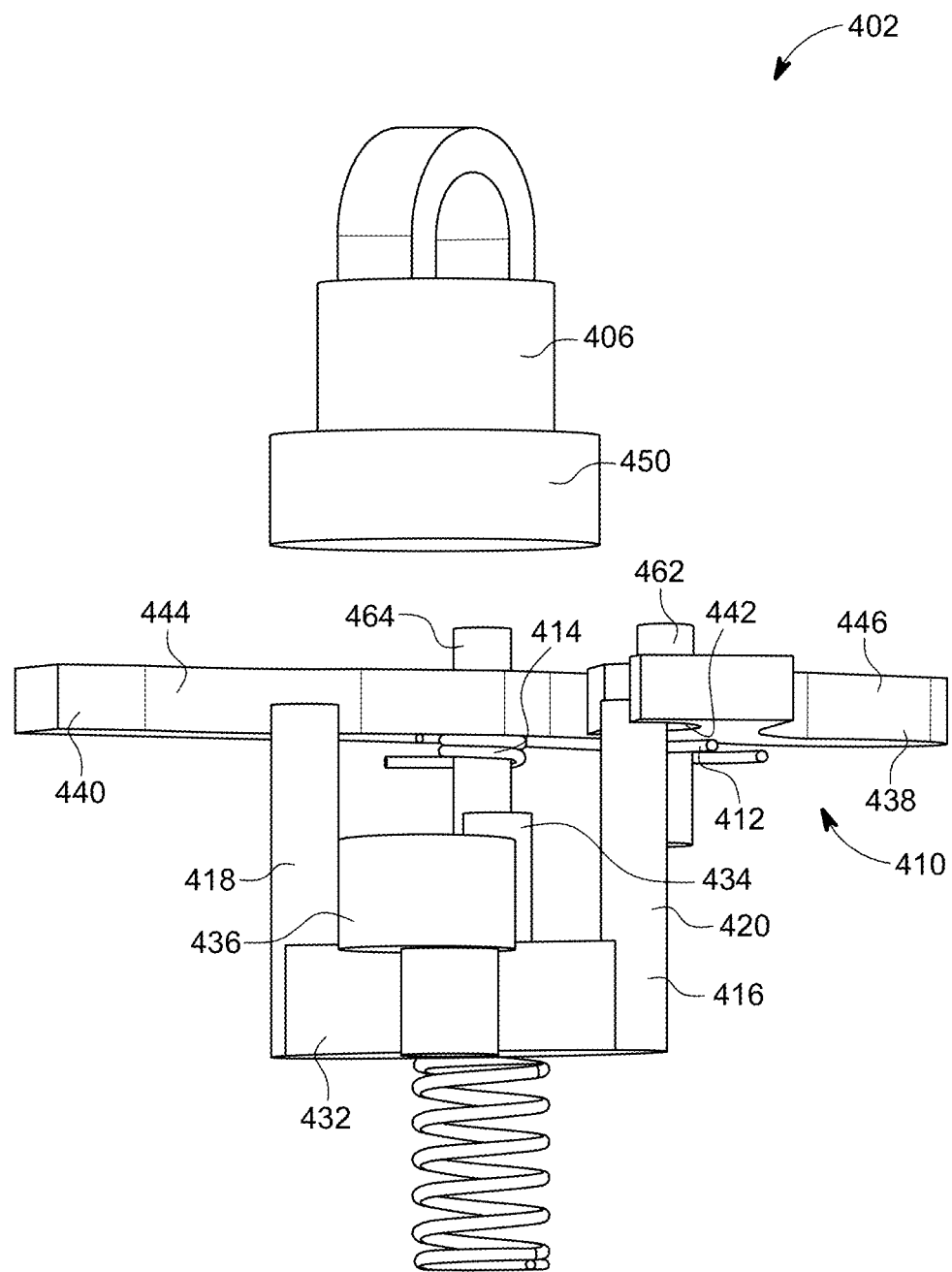
FIG. 19 is an isometric view of internals of the latch of FIG. 17 in the open configuration.
Figure 20:
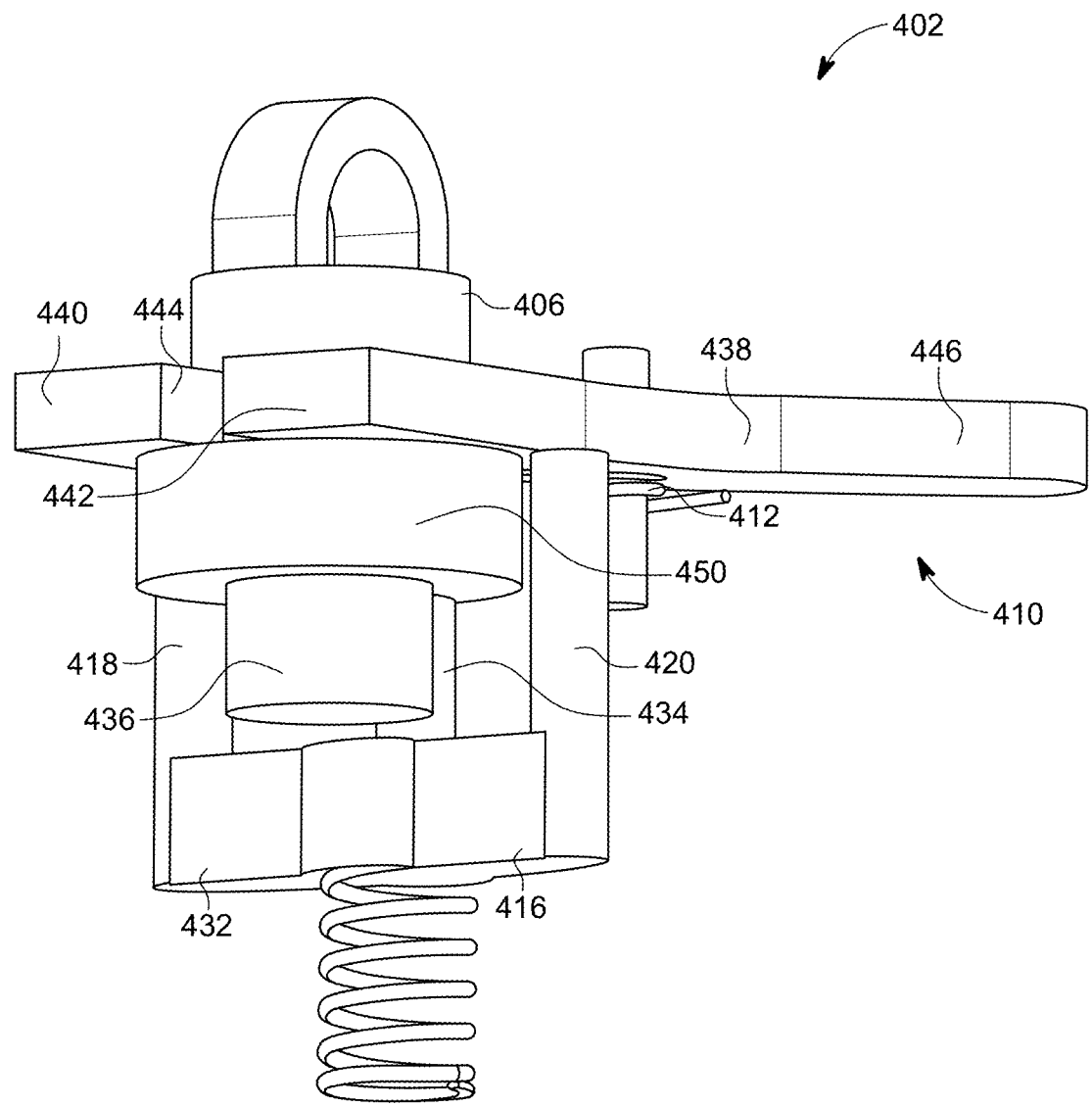
FIG. 20 is an isometric view of internals of the latch of FIG. 17 in the closed configuration.

The latch 402 has a catch 410 that is biased toward the closed configuration shown in FIGS. 18 and 20 by a biasing member. FIGS. 19 and 20 show internal components of catch 410, such as the biasing member including a pair of coil springs 412, 414 that press against an internal surface of the latch coupler 404. As shown in FIG. 19, the latch 402 includes a trigger 416 that biased toward a retaining configuration and is configured to retain the closed-biased catch 410 in the open configuration as shown in FIGS. 17 and 19 until the latchable member 406 actuates the trigger 416 by moving it to the actuated configuration shown in FIG. 20. Unlike the catch 16 of the latch 2 or the catch 210 of the latch 202, the catch 410 pivots about axes that are parallel to the direction that the trigger 416 translates, rather than substantially perpendicular to it.

As shown in FIGS. 19 and 20, the trigger 416 has two opposite retaining arms 418, 420 coupled to each other through a base portion 432. Also extending from the base portion is an actuating portion 434. As shown in FIGS. 19 and 20, the latch 402 has a magnet 436 fixedly coupled to the housing 437 of the latch 402 (housing shown in FIGS. 20 and 21) to facilitate automatic latching of the latchable member 406. In other embodiments, the latch 402 lacks such magnet 436. In embodiments with the magnet 436, the actuating portion 434 is configured to extend away from the base by a sufficient distance that, in the retaining configuration shown in FIG. 22, the actuating portion 434 extends farther from the base portion 432 than the magnet 436 by at least the amount that the retaining arms 416, 418 overlap the paths of the retained portions of the catch 410 to facilitate the latchable member 406 translating the trigger 416 by a sufficient distance to release the catch 410 from the open configuration (contrast FIGS. 22 and 23). In embodiments with the magnet 436, the actuating portion 434 is disposed adjacent to the magnet 436, the actuating portion 434 being constrained in a channel to guide the trigger 416 along translational movement and avoid tipping. In embodiments without the magnet 436, the actuating portion 434 may be coaxial with the trigger's biasing member.

As shown in FIGS. 19 and 20, the catch 410 includes a pair of pivoting arms 438, 440 that have respective catching portions 442, 444 (see FIGS. 19 and 20) and respective finger-engagement portions 446, 448 (see FIGS. 17 and 18). The catching portions 442, 444 are configured to cooperatively trap the flange end portion 450 of the latchable member 406 when the catch 410 is in the closed configuration (see FIGS. 18 and 20). The finger-engagement portions 446, 448 are configured to transition the respective pivoting arms 438, 440 to the open configuration (see FIGS. 17 and 19) when moved (for example, pinched together) by a user.

As shown in FIG. 19, the pivoting arms 438, 440 are configured to pivot about respective pins 462, 464. The biasing members 412, 414 bias the catch 410 toward the closed configuration, and the biasing member 466 biases the trigger 416 toward the retaining configuration. Accordingly, when the user pinches together the finger-engagement portions 446, 448 to transition the catch 410 into the open configuration (and, in embodiments with the magnet 436, the latchable member 406 is pulled away from the magnet 436), the trigger 416 automatically reengages the catch 410, thereby facilitating automatic preparation of the latch 402 for re-use.

As used herein, the following terms take the meanings explicitly associated herein, unless the context clearly dictates otherwise. The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular. The term "one or more" discloses no more than a single one or more than one, up to and including all.

The term "configured" refers to an element being one or more of sized, dimensioned, positioned, or oriented to achieve or provide the recited function or result. The term "substantially parallel" or "similarly oriented" refers to parallel or within 5, 10, 15, 20, 25, 30, 35, 40, or 45 degrees of parallel. The term "substantially perpendicular" refers to perpendicular or within 5, 10, 15, 20, 25, 30, 35, 40, or 45 degrees of perpendicular. The term "approximately" refers to the recited value or range of values or within 5, 10, 15, 20, 25, 30, 35, 40, 45, or 50 percent of such value or a value in such range of values. The term "transverse" means non-parallel but not necessarily crossing.

The term "directly coupled" refers to a component that contacts (for example, when bolted), is integral with, or is welded to another component. The term "indirectly coupled" refers to a component that is coupled to one or more other components that are coupled to a second component or one or more further components that are coupled to the second component. The term "coupled" should be understood to disclose both direct and indirect coupling of components or elements that are described as being coupled to each other, and different embodiments may be directly coupled or indirectly coupled. As used herein, the use of the term "responsive to" does not imply that associated resultant actions are required to occur immediately or within a particular time period; instead, the term "responsive to" is used herein to indicate actions that may occur or be performed in response to one or more conditions being met, unless the context clearly dictates otherwise. Also, the use of "when" does not imply that associated actions are a result of a condition or that the actions are required to occur immediately or within a particular time period; instead, the term "when" is used herein to indicate actions that may occur or be performed at least at a recited moment in time.

While the preferred embodiments of the invention have been illustrated and described, as noted above, many changes can be made without departing from the spirit and scope of the invention. For example, each disclosure of an element or component preferably having a feature or characteristic is intended to also disclose the element or component as being devoid of that feature or characteristic, unless the principles of the invention clearly dictate otherwise. Accordingly, the scope of the invention is not limited by the disclosure of the preferred embodiments. Instead, the invention should be determined entirely by reference to the claims that follow. Moreover, each feature, characteristic, element, or component described herein may be implemented in combination with one or more other features, characteristics, elements, or components described herein. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (for example, "The latch of any one of the preceding or subsequent claims . . . "). This disclosure is also intended to disclose the subject matter of any one of the dependent claims, as if it was an independent claim, with or without all or a portion of the subject matter of the original independent claim(s) or any other subject matter disclosed herein.

We claim:

1. A latch comprising:
a housing that defines a receiver channel that is configured to receive a latchable member;
a catch that is transitionable between an open configuration and a closed configuration, the catch in the open configuration being configured to enable insertion of the latchable member into the receiver channel and to enable removal of the latchable member from the receiver channel, the catch in the closed configuration being configured to at least partially close the receiver channel and preventing removal of the latchable member from the receiver channel;
a trigger that is configured to transition from a retaining configuration to an actuated configuration responsive to the latchable member being received in the receiver channel and moving the trigger, the trigger in the retaining configuration being configured to prevent the catch from transitioning from the open configuration to the closed configuration, the trigger in the actuated configuration being configured to permit the catch to transition from the open configuration to the closed configuration; and
a magnet configured to apply an attractive magnetic force to the latchable member toward the trigger when the latchable member is received in the receiver channel, whereby ease of single-handed use of the latch is improved.

2. The latch of claim 1, wherein the catch is biased toward the closed configuration, and the trigger is biased toward the retaining configuration, whereby ease of single-handed use of the latch is improved.

3. The latch of claim 2, wherein the magnet is configured to apply the attractive magnetic force to the latchable member toward the trigger when the latchable member is received in the receiver channel and contacts the trigger, the magnetic force being greater than the bias of the trigger toward the retaining configuration, whereby ease of single-handed use of the latch is improved.

4. The latch of claim 3, further comprising a biasing member that is configured to bias the trigger toward the retaining configuration, the magnet being disposed between the biasing member and the receiver channel.

5. The latch of claim 2, wherein the catch is configured to prevent the trigger from transitioning from the actuated configuration to the retaining configuration when the catch is in the closed configuration.

6. The latch of claim 5, wherein the catch is biased toward the closed configuration, and the trigger is biased toward the retaining configuration, whereby ease of single-handed use of the latch is improved.

7. The latch of claim 1, further comprising a biasing member that is configured to bias the trigger toward the retaining configuration, wherein the trigger includes a base and extension portions extending from opposite sides of the base toward the receiver channel, the biasing member being configured to contact the base, the extension portions being configured to extend into the receiver channel when the trigger is in the retaining configuration.

8. The latch of claim 7, wherein the magnet is disposed between the base and the receiver channel and between the extension portions, whereby ease of single-handed use of the latch is improved.

9. The latch of claim 1, wherein the receiver channel defines a major dimension and a minor dimension, the major dimension and the minor dimension being substantially perpendicular to a direction in which the latchable member is received in the receiver channel, the latchable member including a bar that has a cross-sectional diameter that is no greater than the minor dimension of the receiver channel.

10. The latch of claim 1, wherein the housing or the catch includes a polymeric material, whereby safety in event of a snagging accident is improved.

11. A dog leash comprising the latch of claim 1.

12. A helmet strap comprising the latch of claim 1.

13. A latch comprising:
a housing that defines a receiver channel that is configured to receive a latchable member, the channel having a channel opening at a first end thereof; and
a catch that is transitionable between an open configuration and a closed configuration, the catch in the open configuration being configured to enable insertion of the latchable member through the channel opening and into the receiver channel and to enable removal of the latchable member from the receiver channel, the catch in the closed configuration being configured to at least partially close the receiver channel and preventing removal of the latchable member from the receiver channel,
wherein the catch defines a smooth convex-shaped surface that is configured to extend across one dimension of the receiver channel when the catch is in the closed configuration, the smooth convex-shaped surface being configured to bear directly against a surface of the latchable member that faces towards the channel opening with the convex-shaped surface in a mid-portion of the channel when the catch is in a closed position extending across the receiver channel to prevent removal of the latchable member from the receiver channel when the latchable member is engaged by the catch in a closed position preventing removal of the latchable member from the receiver channel, whereby the convex-shaped surface of the catch facilitates ease of releasing the latchable member as the surface of the latchable member that faces towards the channel tends to pull against the convex-shaped surface of the catch.

14. The latch of claim 13, further comprising a magnet configured to apply a magnetic force to the latchable member to pull and guide the latchable member into the receiver channel, the magnet being directly in line with the latchable member and the channel, the magnet being at the opposite end of the channel from the channel opening, when the latchable member is received in the receiver channel, whereby ease of single-handed use of the latch is improved.

15. A latch comprising:
a housing that defines a receiver channel that is configured to receive a latchable member, the channel having a first side and a second side and a channel opening at a first end thereof; and
a catch pivotally secured to a second side of the channel near the channel opening, the catch being pivotally transitionable between an open configuration and a closed configuration, the catch in the open configuration being configured to enable insertion of the latchable member through the channel opening and into the receiver channel and to enable removal of the latchable member from the receiver channel, the catch in the closed configuration being configured to at least partially close the receiver channel and preventing removal of the latchable member from the receiver channel,
wherein the housing has a catch limiter in the receiver channel that is configured to contact the catch in the closed configuration and to limit pivoting movement of the catch further in a closure direction of movement of the catch, the catch limiter stopping movement of the catch towards the channel opening, the receiver channel opening being the open end of the channel into which the latchable member is initially inserted.

16. The latch of claim 15, wherein the housing has a first wall on the first side of the channel and a second wall on the second side of the channel that opposes the first wall, the first and second walls at least partially defining the receiver channel, the receiver channel being configured to receive the latchable member between the first and second walls, the first wall defining the catch limiter.

17. The latch of claim 16, wherein each part of the catch is closer to the second wall than the first wall when the catch is in the open configuration, the catch being pivotally connected to the second wall.

18. The latch of claim 15, further comprising a magnet configured to apply a magnetic force to the latchable member to pull and guide the latchable member into the receiver channel when the latchable member is received in the receiver channel, whereby ease of single-handed use of the latch is improved, the magnet being fixed in the housing at an end of the channel opposite the channel opening.

19. A latch comprising:
a housing that defines a receiver channel that is configured to receive a latchable member; and
a catch that is transitionable between an open configuration and a closed configuration, the catch in the open configuration being configured to enable insertion of the latchable member into the receiver channel and to enable removal of the latchable member from the receiver channel, the catch in the closed configuration being configured to at least partially close the receiver channel and preventing removal of the latchable member from the receiver channel;
a trigger that is configured to transition from a retaining configuration to an actuated configuration responsive to the latchable member being received in the receiver channel and the latchable member directly contacting and moving the trigger, the trigger in the retaining configuration being configured to prevent the catch from transitioning from the open configuration to the closed configuration, the trigger in the actuated configuration, after being bump-released by the latchable member, being configured to permit the catch to transition from the open configuration to the closed configuration, the trigger being movable in one direction to allow the catch to move in a direction transverse to the direction of movement of the trigger, and
wherein the catch is biased toward the closed configuration, and the trigger is biased toward the retaining configuration, whereby ease of single-handed use of the latch is improved.

* * * * *